(12) United States Patent
Dugas et al.

(10) Patent No.: US 8,144,424 B2
(45) Date of Patent: Mar. 27, 2012

(54) TIMING-BASED SERVO VERIFY HEAD AND MAGNETIC MEDIA MADE THEREWITH

(76) Inventors: Matthew P. Dugas, St. Paul, MN (US); Gregory L. Wagner, Roseville, MN (US)

(*) Notice: Subject to any disclaimer, the term of this patent is extended or adjusted under 35 U.S.C. 154(b) by 465 days.

(21) Appl. No.: 11/017,529

(22) Filed: Dec. 20, 2004

(65) Prior Publication Data

US 2005/0157422 A1   Jul. 21, 2005

Related U.S. Application Data

(60) Provisional application No. 60/530,943, filed on Dec. 19, 2003.

(51) Int. Cl.
*G11B 5/29* (2006.01)
(52) U.S. Cl. ............................ 360/121; 360/119.01
(58) Field of Classification Search .................. 360/119, 360/121, 119.01, 119.05, 119.06; *G11B 5/265*
See application file for complete search history.

(56) References Cited

U.S. PATENT DOCUMENTS

| | | | |
|---|---|---|---|
| 2,938,962 A | 5/1960 | Konins et al. | |
| 3,192,608 A | 7/1965 | Rinia et al. | |
| 3,417,386 A | 12/1968 | Schneider | |
| 3,699,334 A | 10/1972 | Cohen et al. | |
| 3,750,828 A | 8/1973 | Constable | |
| 3,853,715 A | 12/1974 | Romankiw | |
| 4,007,493 A | 2/1977 | Behr et al. | |
| 4,088,490 A | 5/1978 | Duke et al. | |
| 4,268,881 A | 5/1981 | Saito | |
| 4,298,899 A | 11/1981 | Argumedo et al. | |
| 4,314,290 A | 2/1982 | Ragle | |
| 4,318,146 A | 3/1982 | Ike et al. | |
| 4,408,240 A * | 10/1983 | Pastore | 360/121 |
| 4,457,803 A | 7/1984 | Takigawa | |
| 4,488,188 A | 12/1984 | Hansen et al. | |
| 4,490,756 A | 12/1984 | Dost et al. | |
| 4,535,376 A | 8/1985 | Nomura et al. | |
| 4,539,615 A * | 9/1985 | Arai et al. | 360/121 |
| 4,586,094 A | 4/1986 | Chambors et al. | |
| 4,598,327 A | 7/1986 | Jen et al. | |
| 4,609,959 A | 9/1986 | Rudi | |
| 4,642,709 A | 2/1987 | Vinal | |

(Continued)

FOREIGN PATENT DOCUMENTS

DE   2912309   10/1979

(Continued)

OTHER PUBLICATIONS

Hisatoshi, Hata, Patent Abstracts of Japan (Publication No. 06333210), Feb. 12, 1994.

(Continued)

*Primary Examiner* — Daniell L Negraon
*Assistant Examiner* — Carlos E Garcia

(57) ABSTRACT

A servo head capable of verifying at least one timing based pattern printed on media is provided. The servo head includes a magnetic structure having at least one magnetic element arranged and configured to form at least one magnetic gap parallel to the timing based pattern. In one embodiment, the magnetic element is arranged and configured to have a plurality of magnetic gaps being parallel to each other but not co-linear to each other. In the second embodiment, the magnetic element is arranged and configured to have a magnetic gap being parallel to and co-linear to the timing based pattern.

13 Claims, 33 Drawing Sheets

U.S. PATENT DOCUMENTS

| | | | |
|---|---|---|---|
| 4,673,999 A | 6/1987 | Suyama et al. | |
| 4,685,012 A | 8/1987 | DeWit et al. | |
| 4,752,850 A | 6/1988 | Yamada et al. | |
| 4,758,304 A | 7/1988 | McNeil et al. | |
| 4,758,907 A | 7/1988 | Okamoto et al. | |
| 4,837,924 A | 6/1989 | Lazzari | |
| 4,897,748 A | 1/1990 | Takahashi et al. | |
| 4,901,178 A * | 2/1990 | Kobayashi et al. | 360/125.4 |
| 4,906,552 A | 3/1990 | Ngo et al. | |
| 4,914,805 A | 4/1990 | Kawase | |
| 4,927,804 A | 5/1990 | Zieren et al. | |
| 4,945,438 A * | 7/1990 | Matsumoto et al. | 360/121 |
| 4,971,947 A | 11/1990 | Barnes et al. | |
| 4,992,897 A | 2/1991 | Deroux-Dauphin | |
| 5,016,342 A | 5/1991 | Pisharody et al. | |
| 5,017,326 A | 5/1991 | Wash et al. | |
| 5,027,244 A | 6/1991 | Hayakawa | |
| 5,035,787 A | 7/1991 | Parker et al. | |
| 5,055,951 A | 10/1991 | Behr | |
| 5,067,230 A | 11/1991 | Meunier et al. | |
| 5,079,663 A | 1/1992 | Ju et al. | |
| 5,086,015 A | 2/1992 | Itoh et al. | |
| 5,090,111 A | 2/1992 | Lazzari | |
| 5,093,980 A | 3/1992 | Maurice et al. | |
| 5,124,869 A | 6/1992 | Lehureau | |
| 5,126,231 A | 6/1992 | Levy | |
| 5,132,861 A | 7/1992 | Behr et al. | |
| 5,160,078 A | 11/1992 | Spicer | |
| 5,189,580 A | 2/1993 | Pisharody et al. | |
| 5,195,006 A | 3/1993 | Morikawa | |
| 5,196,969 A | 3/1993 | Iwamatsu et al. | |
| 5,211,734 A | 5/1993 | Yagami et al. | |
| 5,224,260 A | 7/1993 | Fedeli et al. | |
| 5,241,442 A | 8/1993 | Akashi | |
| 5,262,908 A | 11/1993 | Iwamatsu et al. | |
| 5,280,402 A | 1/1994 | Anderson et al. | |
| 5,293,281 A | 3/1994 | Behr et al. | |
| 5,301,418 A | 4/1994 | Dirne et al. | |
| 5,307,217 A | 4/1994 | Saliba | |
| 5,309,299 A | 5/1994 | Crossland et al. | |
| 5,319,502 A | 6/1994 | Feig | |
| 5,321,570 A | 6/1994 | Behr et al. | |
| 5,371,638 A | 12/1994 | Saliba | |
| 5,379,170 A | 1/1995 | Schwarz | |
| 5,394,285 A | 2/1995 | Dee et al. | |
| 5,398,145 A * | 3/1995 | Jeffers et al. | 360/77.12 |
| 5,402,295 A | 3/1995 | Suzuki et al. | |
| 5,405,734 A | 4/1995 | Aita | |
| 5,423,116 A | 6/1995 | Sundaram | |
| 5,432,652 A | 7/1995 | Comeaux et al. | |
| 5,434,732 A | 7/1995 | Schwarz et al. | |
| 5,447,598 A | 9/1995 | Mihara et al. | |
| 5,450,257 A | 9/1995 | Tran et al. | |
| 5,452,152 A * | 9/1995 | Rudi | 360/77.12 |
| 5,452,165 A | 9/1995 | Chen et al. | |
| 5,452,166 A | 9/1995 | Aylwin et al. | |
| 5,488,525 A | 1/1996 | Adams et al. | |
| 5,504,339 A | 4/1996 | Masuda | |
| 5,506,737 A | 4/1996 | Lin et al. | |
| 5,523,185 A | 6/1996 | Goto | |
| 5,523,904 A * | 6/1996 | Saliba | 360/77.12 |
| 5,552,944 A | 9/1996 | Clemow | |
| 5,567,333 A | 10/1996 | Hira et al. | |
| 5,572,392 A | 11/1996 | Aboaf et al. | |
| 5,587,307 A | 12/1996 | Alborn, Jr. et al. | |
| 5,593,065 A | 1/1997 | Harrold | |
| 5,602,703 A * | 2/1997 | Moore et al. | 360/121 |
| 5,606,478 A | 2/1997 | Chen et al. | |
| 5,616,921 A | 4/1997 | Talbot et al. | |
| 5,621,188 A | 4/1997 | Lee et al. | |
| 5,629,813 A | 5/1997 | Baca et al. | |
| 5,639,509 A | 6/1997 | Schemmel | |
| 5,652,015 A | 7/1997 | Aboaf et al. | |
| 5,655,286 A | 8/1997 | Jones, Jr. | |
| 5,665,251 A | 9/1997 | Robertson et al. | |
| 5,666,249 A | 9/1997 | Ohmori et al. | |
| 5,675,461 A | 10/1997 | Aylwin et al. | |
| 5,677,011 A | 10/1997 | Hatakeyama et al. | |
| 5,680,278 A | 10/1997 | Sawtelle, Jr. | |
| 5,689,384 A | 11/1997 | Albrecht et al. | |
| 5,710,673 A | 1/1998 | Varian | |
| 5,715,597 A | 2/1998 | Aylwin et al. | |
| 5,719,730 A | 2/1998 | Chang et al. | |
| 5,723,234 A | 3/1998 | Yokoyama et al. | |
| 5,726,841 A | 3/1998 | Tong et al. | |
| 5,737,826 A | 4/1998 | Slade et al. | |
| 5,742,452 A | 4/1998 | Simmons et al. | |
| 5,751,526 A | 5/1998 | Schemmel | |
| 5,752,309 A | 5/1998 | Partee et al. | |
| 5,757,575 A | 5/1998 | Hallamasek et al. | |
| 5,768,070 A | 6/1998 | Krounbi et al. | |
| 5,771,142 A * | 6/1998 | Maurice et al. | 360/121 |
| 5,793,577 A | 8/1998 | Katz et al. | |
| 5,822,159 A | 10/1998 | Fukuyama et al. | |
| 5,831,792 A | 11/1998 | Ananth | |
| 5,863,450 A | 1/1999 | Dutertre et al. | |
| 5,867,339 A | 2/1999 | Panish et al. | |
| 5,890,278 A | 4/1999 | Van Kesteren | |
| 5,909,346 A | 6/1999 | Malhotra et al. | |
| 5,920,447 A * | 7/1999 | Sakata et al. | 360/121 |
| 5,923,272 A | 7/1999 | Albrecht et al. | |
| 5,930,065 A | 7/1999 | Albrecht et al. | |
| 5,940,238 A | 8/1999 | Nayak et al. | |
| 5,966,264 A | 10/1999 | Belser et al. | |
| 5,966,632 A | 10/1999 | Chen et al. | |
| 5,973,874 A | 10/1999 | Panish et al. | |
| 5,982,711 A | 11/1999 | Knowles et al. | |
| 5,995,315 A | 11/1999 | Fasen | |
| 6,005,737 A | 12/1999 | Connolly et al. | |
| 6,018,444 A | 1/2000 | Beck et al. | |
| 6,021,013 A | 2/2000 | Albrecht et al. | |
| 6,025,970 A | 2/2000 | Cheung | |
| 6,031,673 A * | 2/2000 | Fasen et al. | 360/53 |
| 6,034,835 A | 3/2000 | Serrano | |
| 6,075,678 A | 6/2000 | Saliba | |
| 6,081,401 A | 6/2000 | Varian | |
| 6,088,184 A | 7/2000 | Hu | |
| 6,090,507 A | 7/2000 | Grenon et al. | |
| 6,111,719 A | 8/2000 | Fasen | |
| 6,118,630 A | 9/2000 | Argumedo | |
| 6,130,804 A | 10/2000 | Panish et al. | |
| 6,141,174 A | 10/2000 | Judge et al. | |
| 6,156,487 A | 12/2000 | Jennison et al. | |
| 6,163,421 A | 12/2000 | Sasaki et al. | |
| 6,163,436 A | 12/2000 | Grenon et al. | |
| 6,165,649 A | 12/2000 | Grenon et al. | |
| 6,169,640 B1 * | 1/2001 | Fasen | 360/48 |
| 6,190,836 B1 | 2/2001 | Grenon et al. | |
| 6,222,698 B1 | 4/2001 | Barndt et al. | |
| 6,229,669 B1 | 5/2001 | Beck et al. | |
| 6,236,525 B1 | 5/2001 | Cates et al. | |
| 6,236,538 B1 | 5/2001 | Yamada et al. | |
| 6,269,533 B2 * | 8/2001 | Dugas | 29/603.13 |
| 6,275,350 B1 | 8/2001 | Barndt | |
| 6,282,051 B1 | 8/2001 | Albrecht et al. | |
| 6,307,718 B1 | 10/2001 | Kasetty | |
| 6,320,719 B1 | 11/2001 | Albrecht et al. | |
| 6,433,949 B1 | 8/2002 | Murphy et al. | |
| 6,445,550 B1 | 9/2002 | Ishi | |
| 6,462,904 B1 | 10/2002 | Albrecht et al. | |
| 6,469,867 B2 | 10/2002 | Saliba | |
| 6,496,328 B1 | 12/2002 | Dugas | |
| 6,542,325 B1 | 4/2003 | Molstad et al. | |
| 6,545,837 B1 | 4/2003 | Tran | |
| 6,574,066 B1 | 6/2003 | Stubbs et al. | |
| 6,590,729 B1 | 7/2003 | Akagi et al. | |
| 6,622,490 B2 | 9/2003 | Ingistov | |
| 6,635,404 B1 | 10/2003 | Choi et al. | |
| 6,650,496 B2 | 11/2003 | Nozieres et al. | |
| 6,700,729 B1 | 3/2004 | Beck et al. | |
| 6,721,126 B1 | 4/2004 | Bui et al. | |
| 6,744,594 B2 * | 6/2004 | Denison et al. | 360/121 |
| 6,754,026 B1 | 6/2004 | Koski | |
| 6,778,359 B1 * | 8/2004 | Iwama | 360/129 |
| 6,781,778 B1 | 8/2004 | Molstad et al. | |
| 6,795,246 B2 | 9/2004 | Yano et al. | |
| 6,798,608 B2 | 9/2004 | Chliwnyj et al. | |

| | | | |
|---|---|---|---|
| 6,801,383 B2 | 10/2004 | Zweighaft et al. | |
| 6,801,391 B2 | 10/2004 | Sugawara et al. | |
| 6,831,805 B2 | 12/2004 | Chliwnyj et al. | |
| 6,842,305 B2 | 1/2005 | Molstad et al. | |
| 6,865,050 B2* | 3/2005 | Nakao et al. | 360/75 |
| 6,873,487 B2 | 3/2005 | Molstad | |
| 6,879,457 B2 | 4/2005 | Eaton et al. | |
| 6,894,869 B2 | 5/2005 | Dugas | |
| 6,943,987 B1 | 9/2005 | Raymond et al. | |
| 6,947,247 B2 | 9/2005 | Schwarz et al. | |
| 6,947,256 B2 | 9/2005 | Biskeborn et al. | |
| 6,950,277 B1 | 9/2005 | Nguy et al. | |
| 6,963,467 B2 | 11/2005 | Bui et al. | |
| 6,970,312 B2 | 11/2005 | Yip et al. | |
| 6,987,648 B2 | 1/2006 | Dugas | |
| 6,989,950 B2 | 1/2006 | Ohtsu | |
| 6,989,960 B2 | 1/2006 | Dugas | |
| 7,009,810 B2 | 3/2006 | Dugas | |
| 7,072,133 B1* | 7/2006 | Yip et al. | 360/53 |
| 7,106,544 B2 | 9/2006 | Dugas et al. | |
| 7,119,976 B2 | 10/2006 | Biskeborn et al. | |
| 7,130,152 B1 | 10/2006 | Raymond et al. | |
| 7,142,388 B2* | 11/2006 | Tateishi et al. | 360/77.12 |
| 7,190,551 B2 | 3/2007 | Suda | |
| 7,196,870 B2 | 3/2007 | Dugas | |
| 7,206,170 B2* | 4/2007 | Yip | 360/241.1 |
| 7,218,476 B2 | 5/2007 | Dugas | |
| 7,283,317 B2 | 10/2007 | Dugas et al. | |
| 7,301,716 B2 | 11/2007 | Dugas et al. | |
| 7,426,093 B2 | 9/2008 | Dugas | |
| 7,450,341 B2 | 11/2008 | Dugas et al. | |
| 7,515,374 B2 | 4/2009 | Nakao | |
| 7,525,761 B2 | 4/2009 | Dugas | |
| 2001/0003862 A1 | 6/2001 | Dugas | |
| 2001/0045005 A1 | 11/2001 | Dugas | |
| 2002/0034042 A1* | 3/2002 | Hungerford et al. | 360/121 |
| 2002/0058204 A1 | 5/2002 | Khojasteh et al. | |
| 2002/0061465 A1 | 5/2002 | Hasegawa et al. | |
| 2002/0125289 A1 | 9/2002 | Huetter | |
| 2002/0171974 A1 | 11/2002 | Dugas | |
| 2002/0177066 A1 | 11/2002 | Song et al. | |
| 2003/0016446 A1 | 1/2003 | Yano | |
| 2003/0039063 A1 | 2/2003 | Dugas | |
| 2003/0048563 A1 | 3/2003 | Magnusson | |
| 2003/0093894 A1* | 5/2003 | Dugas et al. | 29/603.15 |
| 2003/0099057 A1* | 5/2003 | Molstad | 360/75 |
| 2003/0099059 A1 | 5/2003 | Nakao | |
| 2003/0137768 A1 | 7/2003 | Chliwnyj et al. | |
| 2003/0151844 A1 | 8/2003 | Eaton et al. | |
| 2004/0001275 A1 | 1/2004 | Chliwnyj et al. | |
| 2004/0109261 A1 | 6/2004 | Dugas | |
| 2004/0145827 A1 | 7/2004 | Biskeborn et al. | |
| 2004/0174628 A1 | 9/2004 | Schwarz et al. | |
| 2005/0007323 A1 | 1/2005 | Appelbaum et al. | |
| 2005/0052779 A1 | 3/2005 | Nakao et al. | |
| 2005/0052783 A1 | 3/2005 | Suda | |
| 2005/0099073 A1 | 5/2005 | Molstad et al. | |
| 2005/0099715 A1 | 5/2005 | Yip et al. | |
| 2005/0152066 A1 | 7/2005 | Yip | |
| 2005/0168869 A1 | 8/2005 | Dugas et al. | |
| 2005/0180040 A1 | 8/2005 | Dugas et al. | |
| 2005/0219734 A1 | 10/2005 | Rothermel et al. | |
| 2005/0254170 A1 | 11/2005 | Dugas et al. | |
| 2005/0259364 A1 | 11/2005 | Yip | |
| 2005/0275968 A1 | 12/2005 | Dugas | |
| 2006/0061906 A1* | 3/2006 | Dugas | 360/121 |
| 2006/0126207 A1 | 6/2006 | Johnson et al. | |

FOREIGN PATENT DOCUMENTS

| | | |
|---|---|---|
| EP | 0 407 244 | 1/1991 |
| EP | 0 690 442 | 1/1996 |
| EP | 0 328 104 | 8/1998 |
| EP | 0 913 813 A2 | 5/1999 |
| JP | 53-0072119 | 1/1978 |
| JP | 58146011 | 8/1983 |
| JP | 59-008833 | 1/1984 |
| JP | 60-078347 | 4/1985 |
| JP | 61-151667 | 6/1986 |
| JP | 61-174630 | 8/1986 |
| JP | 61-291074 | 12/1986 |
| JP | 01-064104 | 3/1989 |
| JP | 02-094019 | 4/1990 |
| JP | 02-097659 | 4/1990 |
| JP | 02-288530 | 10/1990 |
| JP | 03-078104 | 4/1991 |
| JP | 03-198210 | 8/1991 |
| JP | 03-269804 | 12/1991 |
| JP | 03-324223 | 12/1991 |
| JP | H04-090110 | 3/1992 |
| JP | 04-091317 | 4/1992 |
| JP | 4103009 | 4/1992 |
| JP | 06-035569 | 3/1994 |
| JP | 06-089412 | 3/1994 |
| JP | 07-187016 | 7/1994 |
| JP | 06-243429 | 9/1994 |
| JP | 06-242827 | 10/1994 |
| JP | 06-301926 | 10/1994 |
| JP | 06-333210 | 12/1994 |
| JP | 09-138912 | 5/1997 |
| JP | 09-219006 | 8/1997 |
| JP | 09-219010 | 8/1997 |
| JP | 10-011714 | 1/1998 |
| JP | 10-198918 | 7/1998 |
| JP | H10-269526 | 10/1998 |
| JP | 11-039623 | 2/1999 |
| JP | 11-045402 | 2/1999 |
| JP | 11-242803 | 9/1999 |
| JP | 10-334435 | 12/1999 |
| JP | 11-353609 | 12/1999 |
| JP | 2002-308945 | 10/2002 |
| JP | A-2003-168203 | 6/2003 |
| JP | 2005-063623 | 3/2005 |
| WO | WO 97/05603 | 2/1997 |
| WO | WO 97/40493 | 10/1997 |
| WO | WO 99/50834 | 10/1999 |
| WO | WO 99/67777 | 12/1999 |
| WO | WO 00/51109 | 8/2000 |
| WO | WO 01/50463 | 7/2001 |

OTHER PUBLICATIONS

Yiqun, Li, et al. "Magnetic Properties and Crystal Structure of FeTaAIN Soft Magnetic Materials for MIG Head", (Abstract), J. Appl. Phys. 79 (8), Apr. 15, 1996.

Albrecht, Thomas et al. "Time-Based, Track-Following Servos for Linear tape Drives", Data Storage, Oct. 1997.

Monigle, William C. "FIBs Probe and Fix Semiconductor Problems", Test & Measurement World, May 1988.

Fujiii, S. et al., "A Planarization technology using a bias-deposited dielectric film and an etch-backprocess", IEEE Transactions on, vol. 35, Issue 11, Nov. 1988, pp. 1829-1833.

McDermott, Michael, "Head Makers Discovery Focused Ion Beams", Data Storage, Mar. 1998.

R.C. Barrett, et al., "Timing based Track-Following Servo for Linear Tape Systems", IEEE Transactions on Magnetics, vol. 34, No. 4, Jul. 1998, pp. 1872-1877.

IBM TDB "Hybrid Thin R W Head with Bonding by Laser Beam", vol. 19, Issue No. 2, pp. 681-682 (Jul. 1976).

Dee et al., "Advanced Multi-Track Tape Head for High Performance Tape Recording Application", Mar. 1999, IEEE Transactions Magnetics, vol. 35, No. 2, pp. 712-717.

* cited by examiner

TBS Pattern
on Tape

TIMING-BASED SERVO VERIFY HEAD AND MAGNETIC MEDIA MADE THEREWITH

CROSS-REFERENCE TO RELATED APPLICATION(S)

This application claims the benefit of U.S. Provisional application No. 60/530,943, entitled "Time-Based Servo Heads Using Discrete Single Channel Head Elements and Methods for Making the Same," filed on Dec. 19, 2003, the subject matter of which is hereby incorporated by reference herein in its entirety.

FIELD OF THE INVENTION

The present invention relates generally to recording and reading data from magnetic storage media and, more particularly, to a magnetic head and method thereof for verifying timing-based servo tracks or patterns on magnetic storage media.

BACKGROUND OF THE INVENTION

Due to the density of modern magnetic data storage media, magnetic data storage media requires servo tracks be printed onto the media to minimize data-track registration errors. The servo tracks are often written onto the storage media in the media production facility, where it is necessary, after writing servo tracks or patterns, to verify that the tracks have been properly printed onto the media and meet the production specifications. This verification process is accomplished by running a servo verify magnetic recording head, e.g. read head, over the media on which the servo tracks are printed.

A servo head, in this case particularly a servo verify head, generally requires an ensemble of magnetic structures. Standard processing techniques and tools for assembling magnetic structures generally operate in an orthonormal coordinate system. Thus, the processing of magnetic structures at an angle to the standard processing planes poses unique challenges.

In the magnetic data storage media industry, there are many methods of writing or implementing magnetic servo tracks on storage media. Servo tracks have many different geometries. One specific method and geometry is that of timing based servo (TBS). TBS utilizes successive magnetic transitions written on the media at non-orthogonal angles with respect to the travel direction of the media (e.g. tape). FIG. 2a illustrates this method. Two separate servo bands 42 are shown, with a set of four magnetic patterns or tracks 40a and 40b at +6° and −6° respectively.

The uniqueness of TBS patterns is due to magnetic structures at an angle to standard processing planes, i.e. non-orthogonal angles with respect to the travel direction of media. To verify TBS patterns or tracks on the media, it is desired that the magnetic sensing regions (read gap) on a servo verify head are effectively parallel to the corresponding magnetic transitions (servo patterns) printed on the media. Non-parallelism between the magnetic transition on the tape and the magnetic read head may lead to detection inefficiencies and lower sensitivity of the resultant signals through azimuth loss.

One method for verifying a TBS pattern is to sense or read a full servo transition at once, a so-called full-band verify. With this method, the full pattern width of any single transition is detected at once. With full-band verify, it is desirable to have good azimuth alignment between the magnetic head read gap and the servo transition on tape. Misalignment between these will cause the magnetic transition to be effectively smeared across the read sensor, causing detection efficiency and sensing accuracy loss. Severe azimuth misalignment, may even cause more than one magnetic transition to be intersecting the read sensor (gap) simultaneously, confusing what transition was verified.

Another method for verifying a TBS pattern is the so-called partial-band verify. With this method, a narrow read gap magnetic head is used. If the read gap width is sufficiently small relative to the TBS pattern width, the amount of azimuth misalignment acceptable is eased. In one example, a TBS pattern with a width of 190 µm at an angle of 6° can be verified by a read sensor with a width of 5-10 µm at an azimuth angle of 0°. This method allows the production of a servo verify head without the complexity of processing previously mentioned. This method also requires that the servo verify head be mechanically scanned along the TBS pattern transition width to sample the full servo pattern. Both the above mentioned methods have advantages and disadvantages and are practiced in the industry.

One advantage of the full-band verify method is that the head is stationary, eliminating the need for a scanning actuator to move the head in the cross-track direction. Another advantage of the full-band verify method is that the entire width of each pattern in the servo band is verified. On the other hand, it may be difficult for the full-band verify method to detect small localized defects in the servo pattern. In one example, a localized defect of 5 µm along a 190 µm track width, which is repeated down the servo band, may not be properly detected.

One advantage of the partial-verify method is that the repeatable small local defects previously mentioned can be intersected and properly detected as the head scans back and forth. In a partial-verify method, however, an appropriate scan rate, i.e., how long it takes to scan the width of a servo band, may be desired in representing the fraction of any servo pattern sampled. Large temporary defects where a significant portion of a servo pattern is missing, and where the defects only repeat for a small number of servo patterns, may not be intersected by the scanning head and hence be undetected. Hence, it is desirable to detect these defects with an appropriate scan rate and in an efficient and capable manner in the production facility.

Also, in the processing of magnetic structures of a servo head for verifying TBS patterns, independent channels at a specified angle are desired. This allows each servo pattern and any defects of that servo pattern to be detected independent of any other servo pattern.

Further, in the processing of magnetic structures of a servo head for verifying TBS patterns, it is desirable to assemble or bond independent cores while maintaining multi-dimensional tolerances.

An additional feature of a magnetic servo verify head is a proper head to tape interface. If the head to tape interface is poor, the tape may not contact the head appropriately, leading to sensing inefficiency. A magnetic head surface generally requires an appropriate geometry to obtain a good or acceptable head to tape interface. One standard geometry for a magnetic servo head used in the industry is a cylindrical contour. As an example, typical cylindrical contours may have a radius from 5 mm to 25 mm. A cylindrical contour generally limits the length of the head (down-tape or down-track direction) to achieve a good interface. Therefore, the spatial location acceptable for magnetic elements on a cylindrical contour is restricted.

Thus, depending on the desirable geometry and form factor of a magnetic servo head surface, TBS patterns may add a high degree of complexity to processing techniques of the ensemble of magnetic structures for a servo verify head.

Therefore, there is a need for a servo head to verify TBS patterns printed on data storage media, and further there is a need for a method of assembling a servo head having acceptable head geometry and form factor of a servo head surface to be adapted for verifying TBS patterns.

SUMMARY OF THE INVENTION

In accordance with the present invention, a servo head or servo verify head capable of verifying at least one timing based pattern printed on media comprises a magnetic structure including at least one magnetic bar or magnetic element arranged and configured to form at least one magnetic gap parallel to the timing based pattern. In one embodiment, the magnetic element is arranged and configured to have a plurality of magnetic gaps being parallel to each other but not co-linear to each other. In the second embodiment, the magnetic element is arranged and configured to have a plurality of magnetic gaps being both parallel and co-linear to each other.

Further in one embodiment of the present invention, the magnetic element includes a plurality of individual gap bars bonded to each other, each gap bar having a pair of magnetic cores bonded together with the magnetic gap disposed therebetween. The magnetic gap is an angled gap which is non-orthogonal to an edge of the magnetic element.

Also, in accordance with the present invention, a method of forming a servo head capable of verifying at least one timing based pattern printed on media comprises the steps of: providing a magnetic gap element having a pair of magnetic element elements bonded together with a magnetic gap disposed therebetween, the magnetic gap extending linearly along the element and being parallel to the timing based pattern.

In one embodiment, the method further comprises the steps of: dicing the magnetic gap element into individual cores at an angle to the magnetic gap such that the magnetic gap is non-orthogonal to an edge of the magnetic element; and assembling the cores into a composite structure on a reference block, such that the gaps of the cores are parallel to each other.

Still in one embodiment, the method further comprises the steps of: bonding the cores against the reference block by spring means; removing a portion of the composite structure to form an azimuthal multicore which includes a plurality of magnetic structures on one side of the azimuthal multicore, and each magnetic structure including a magnetic gap; bonding a slider element onto the azimuthal multicore; and exposing the magnetic structures including the magnetic gaps, wherein the magnetic gaps are parallel to each other.

Additionally in one embodiment, the method further comprises the steps of: processing a second magnetic gap element having exposed magnetic structures including magnetic gaps wherein the magnetic gaps are parallel to each other and a slider element bonded onto an azimuthal multicore; bonding the first magnetic gap element and the second magnetic gap element onto a spacer disposed therebetween.

In the second embodiment of the present invention, the magnetic structure includes a first gap element having a first pair of magnetic cores bonded together with a first magnetic gap disposed therebetween, and a second gap element having a second pair of magnetic cores bonded together with a second magnetic gap disposed therebetween. The first and second magnetic elements are arranged and configured to be bonded onto a spacer disposed therebetween such that the first and second magnetic gaps are angled and parallel to the timing based patterns on the media and are non-orthogonal to an edge of the magnetic structure.

Also, in accordance with the second embodiment of the present invention, the method of forming a servo head capable of verifying at least one timing based pattern printed on media further comprises the steps of: removing a portion of the magnetic element to form a plurality of magnetic structures on one side of the magnetic element, and each magnetic structure including a magnetic gap; bonding a slider element onto the magnetic structures; and exposing the magnetic structures including the magnetic gaps.

Additionally in the second embodiment, the method further comprises the steps of: processing a second magnetic gap element having exposed magnetic structures including magnetic gaps; bonding a second slider element onto the magnetic structures; exposing the magnetic structures including the magnetic gaps; and bonding the first magnetic gap element and the second magnetic gap element onto a spacer disposed therebetween.

Further, in accordance with the present invention, the magnetic element is a thin film head row bar.

Further in one embodiment of the present invention, one servo verify head covers the entire length of the timing based patterns so as to verify the timing based patterns in its entirety at the same time. In another embodiment, a plurality of servo verify heads cover the entire length of the timing based patterns so as to verify the timing based patterns in its entirety at the same time. In a third embodiment, a servo verify head covers a part of the entire length of the timing based patterns and scans the timing based patterns by moving the servo verify head along the patterns.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The present invention relates to heads for use with magnetic tape, and methods for forming heads. Various embodiments of the present invention are described herein.

Figure 1:
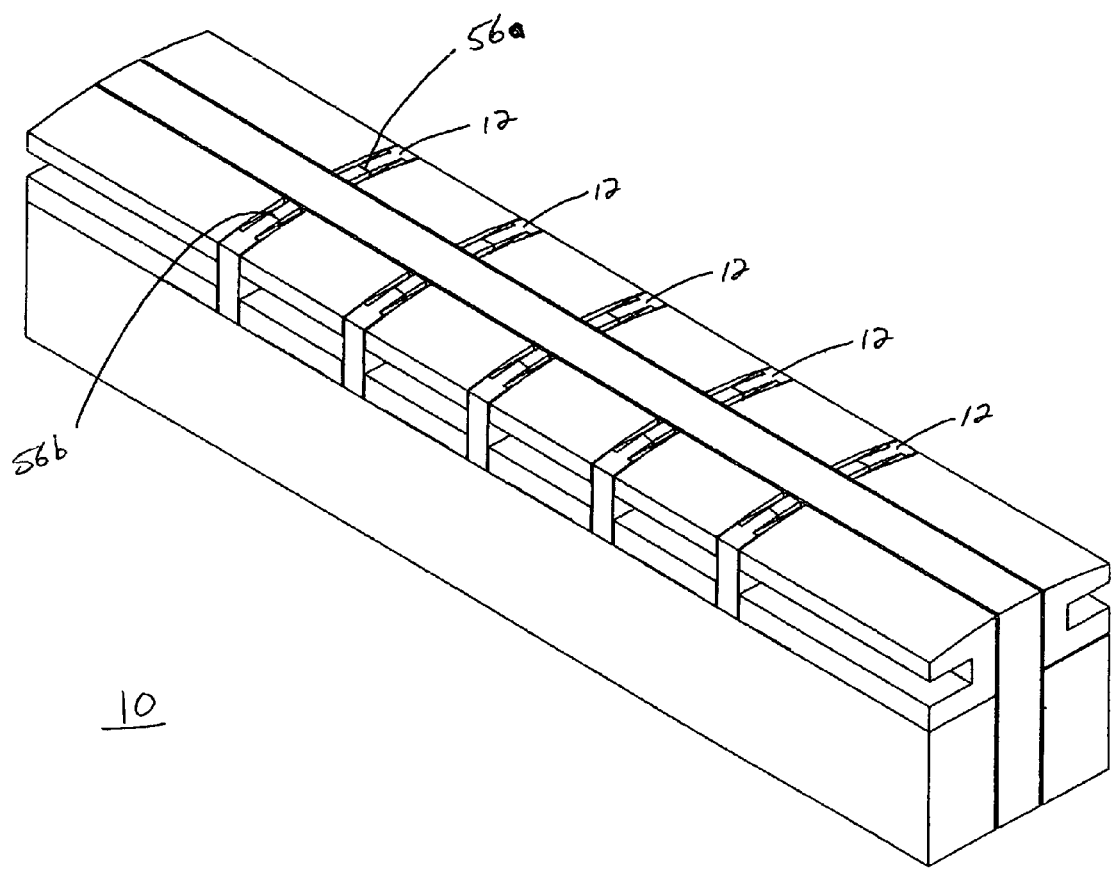
FIG. 1 illustrates a perspective view of one embodiment of a timing-based servo verify head in accordance with the principles of the present invention.

FIG. 1 shows a head 10 having five channels 12 with each channel having a first magnetic structure (first gap) 56a and a second magnetic structure (second gap) 56b. As shown in FIG. 1, each of the first magnetic structures 56a are parallel but not collinear and each of the second magnetic structures 56b are parallel but not collinear. As shown in FIG. 1, the first magnetic structures are −6 degrees from a x-axis, and the second magnetic structures are +6 degrees from a x-axis. Also, in head 10, each magnetic structure is magnetically and electrically independent. The head as shown in FIG. 1 may be used to verify a TBS pattern written to a tape. In use, the head shown in FIG. 1 has a surface contour that provides a good or acceptable head to tape interface.

With reference to FIGS. 2-12, a technique to manufacture heads having magnetic structures that include angles will be described. The process to be described enables the manufacture of any single magnetic line pattern that can be mechanically diced and reassembled to have mechanically and electrically independent channels with the line having any angle. Moreover, as will be made clear by the manufacturing process, the resulting head may have magnetic structures in each of the channels that are not parallel or collinear to each other. Alternatively, the heads may be manufactured to provide parallel and/or collinear relationships between the magnetic structures in one or more of the channels. Also, the process provides for a high degree of precision (e.g., within a micron or two).

Figure 2:
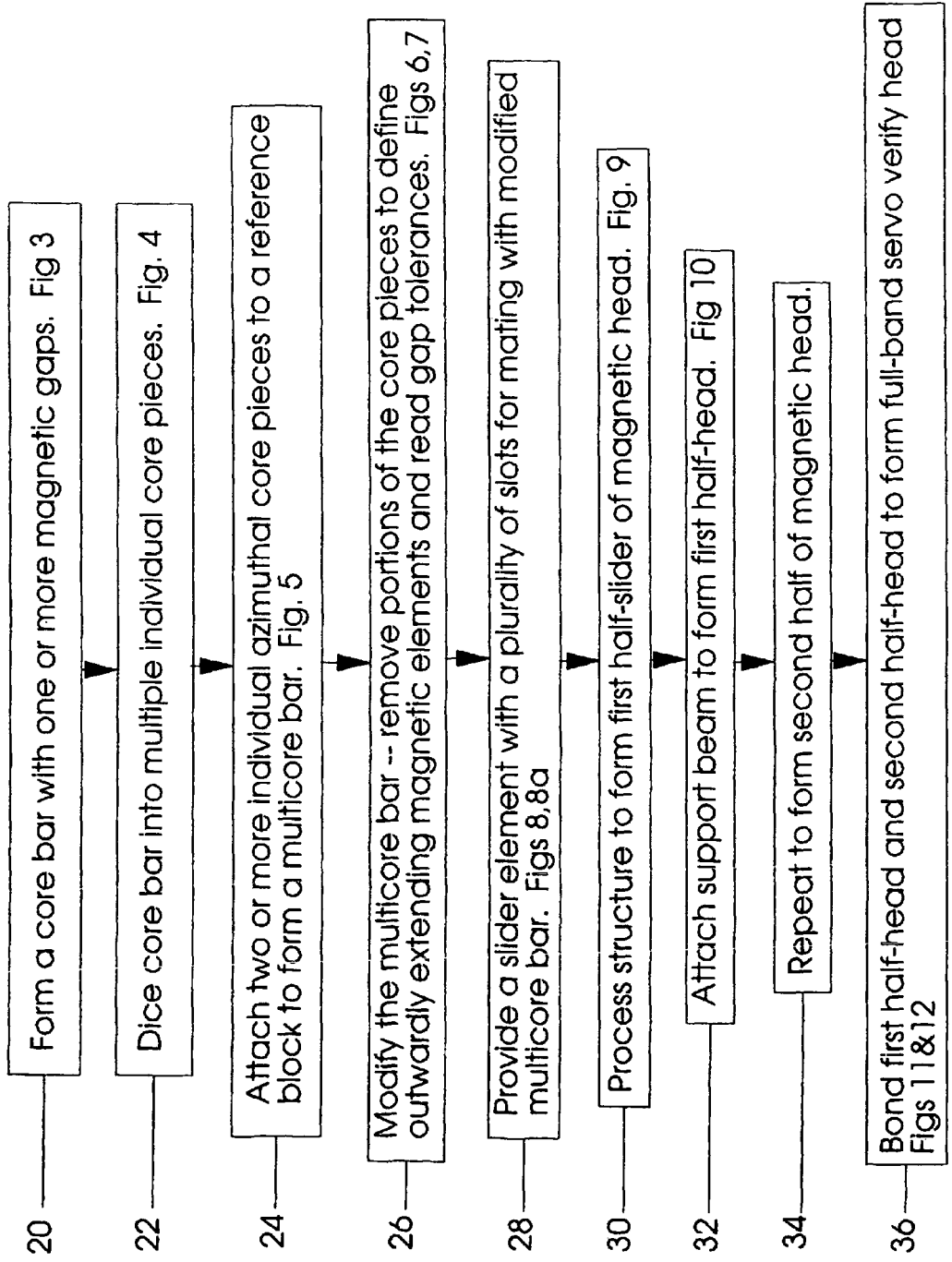
FIG. 2 illustrates a flow chart of one exemplary process of forming a timing-based servo verify head in accordance with the principles of the present invention.
Figure 2A:
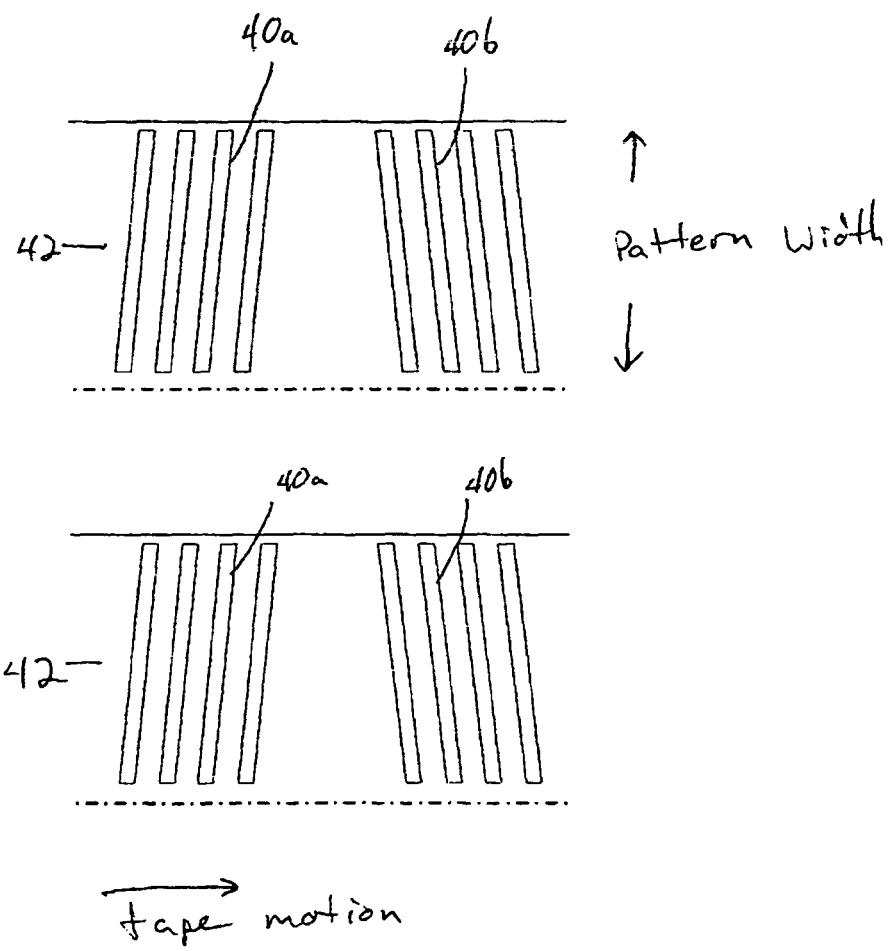
FIG. 2a illustrates a top view of one embodiment of a timing-based servo pattern on a magnetic tape.

FIG. 2 illustrates one example of the operations for forming a magnetic tape head with discrete and independent magnetic elements, in accordance with one embodiment of the present invention. This process can be utilized to form a magnetic tape head as shown in the example of FIG. 1 or other tape heads having two or more discrete and independent magnetic elements aligned in a precise manner.

The operations of FIG. 2 may be used to form a magnetic head without having to bond or connect in multiple operations the plurality of magnetic servo elements to portions of the magnetic head. The operations of FIG. 2 provide for precise alignments of the plurality of individual core pieces to form a magnetic head using these operations. Accordingly, the operations of FIG. 2 can be used to form a magnetic head having typical or standard head geometries, without the need for the manufacturing process having to include multiple alignment operations of each magnetic element to one another. Hence, the operations of FIG. 2 may be used to form a head with a typical or standard head to tape interface.

In one example, an azimuth head having a plurality of independent and aligned magnetic structure is generally formed by creating a first half of the head and a second half of the head, then attaching the first half with the second half with a spacer portion therebetween. Operations 20-34 of FIG. 2 may be used to form the halves of the head structures, and operation 36 assembles the halves to form the final head structure, in one example.

Figure 3:
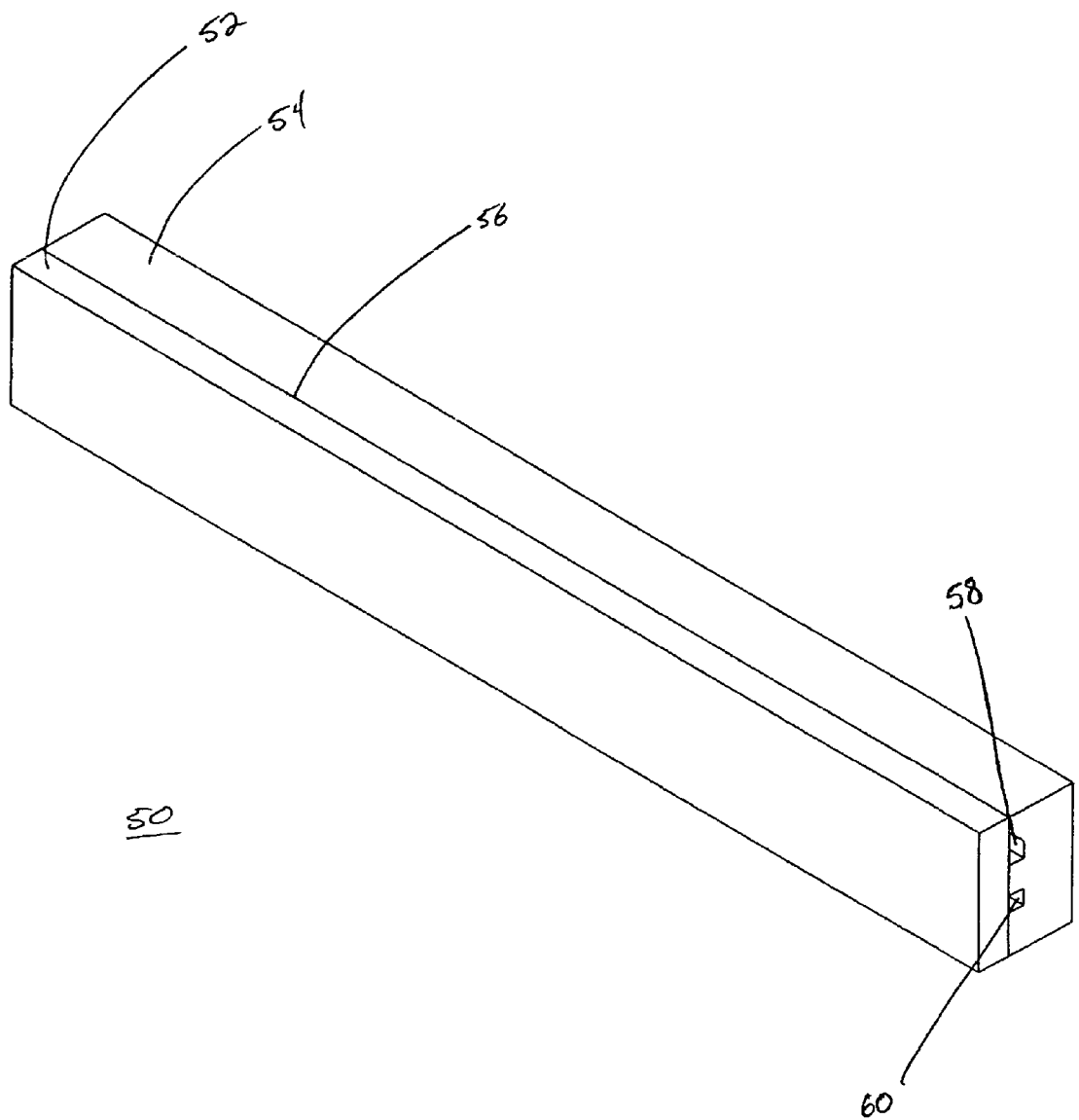
FIG. 3 illustrates a perspective view of one embodiment of a core bar in the process of forming a timing-based servo verify head of FIG. 1 in accordance with the principles of the present invention.

At operation 20, a magnetic ferrite gap bar, or core bar, is formed with one or more magnetic gaps or cavities defined between at least two types of magnetic materials. One example of a core bar 50 is shown in FIG. 3. In one example, the core bar may be a generally elongated, rectangular structure, having a first portion 52, a second portion 54, and a magnetic read/write gap 56. The first portion of the core bar may be generally rectangular and include an interface (gap) surface for attachment to the second portion of the core bar. The second portion of the core bar may be a generally elongated, rectangular structure having two or more slots 58 and 60 extending linearly along the length of the second portion. The slot 58 will be used to wind wire to energize the magnetic structure. The slot 60 exists to define the height of the magnetic core when full processing is completed. The first and second portions are bonded together using conventional glass bonding or other conventional bonding techniques. The faces of portions 52 and 54 where they are joined typically contain a thin nonmagnetic spacing material. This spacing material, typically 0.3 µm to a few µm thick, results in the magnetic read/write gap 56.

In one example, the first 52 and second 54 portions of the core bar may be made from magnetic ceramic materials such as NiZn Ferrite.

Figure 4:
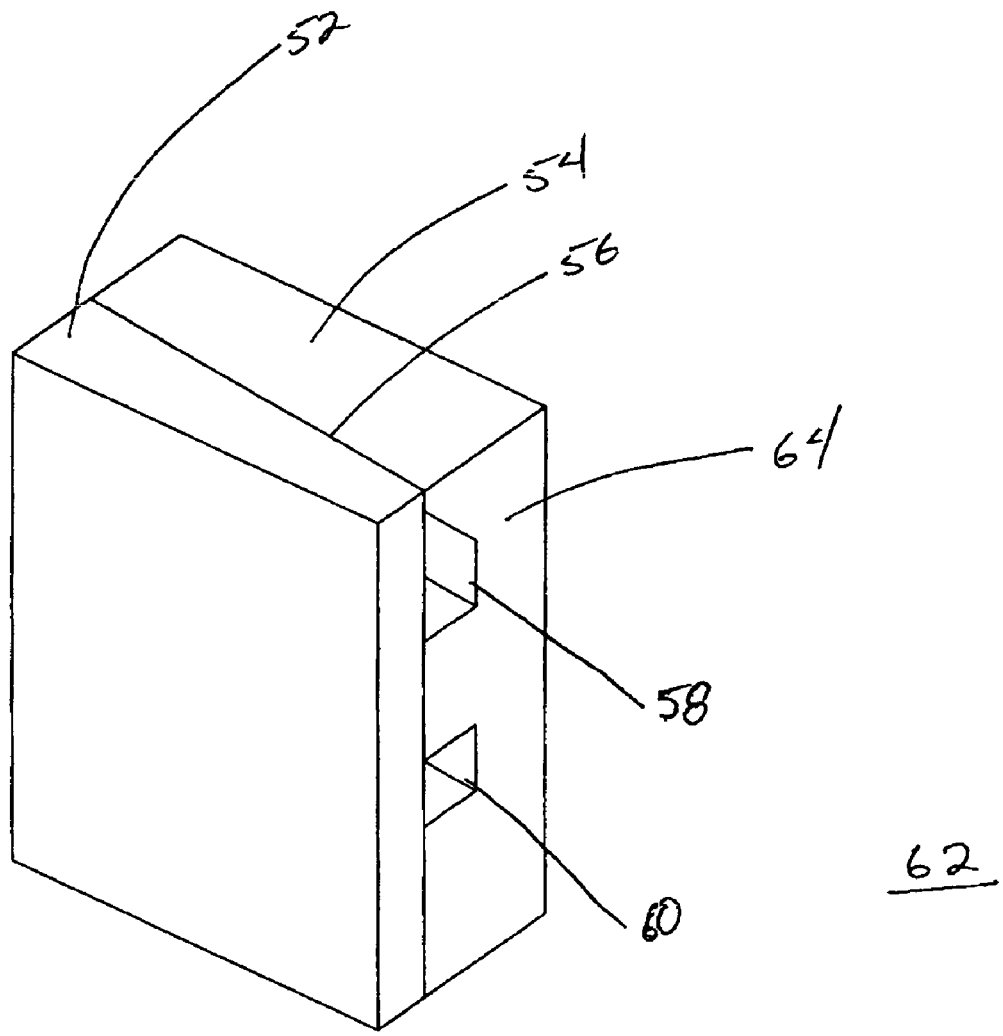
FIG. 4 illustrates a perspective view of one embodiment of an individual core piece formed from the core bar of FIG. 3 in the process of forming a timing-based servo verify head of FIG. 1 in accordance with the principles of the present invention.

At operation 22, the core bar 50 may be divided or diced into multiple individual azimuth core pieces 62. One example of an individual core piece is shown in FIG. 4. In one example, the core bar is diced into individual azimuth core pieces at an angle of +6° or −6° to the gap 56. These cores are then squared or made orthogonal to the diced face 64, resulting in an orthogonal cross-section with the angled gap 56.

Figure 5:
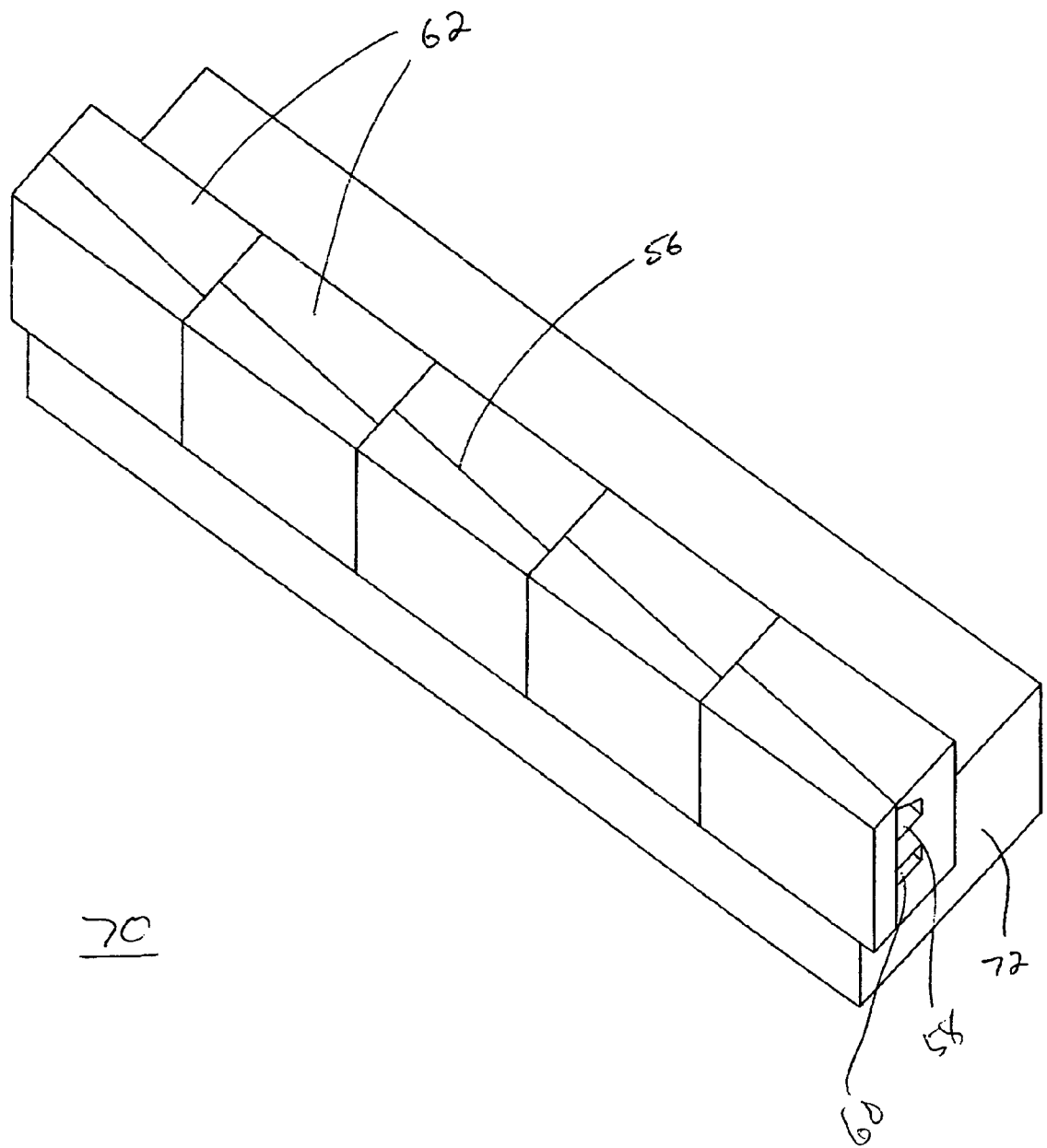
FIG. 5 illustrates a perspective view of one embodiment of a plurality of individual core pieces of FIG. 4 attached to a reference block to form a multicore bar in the process of forming a timing-based servo verify head of FIG. 1 in accordance with the principles of the present invention.

At operation 24, FIG. 5, two or more core pieces 62 are attached to a reference block 72 to form an azimuthal multi-core bar 70, each core piece being accurately positioned relative to one another on the reference block. In one example, the reference block 72 is a generally elongated L-shaped structure defining a shelf portion upon which the core pieces are positioned. The reference block 72 may be made from any suitable material which maintains dimensional stability. In one example, the reference block 72 is made from BaTiO for a stable material matched with the magnetic ceramic 52 and 54 for thermal expansion characteristics. In this operation, the parallelism of the gaps 56, the co-planarity of the cores surfaces of 62, and the distance between the cores is governed by the desired final head design requirements. In one example, a bonding tool or fixture is used to position and reference the core pieces on the reference block. This bonding tool references each core independently and maintains the core independently referenced in five degrees of freedom. The sixth degree of freedom is also constrained, but not independently for each core. In this dimension, the core references are coupled. Once the cores are thus positioned, they are bonded to the reference block to accurately secure their relative positions for further processing. The bonding fixture allows the cores to be either epoxy bonded or glass bonded to the reference block, with a possible temperature range of 50-750° F., while maintaining the multidimensional reference. FIG. 5 is one example of an azimuthal multicore bar 70, showing five cores or core pieces 62.

Figure 6:
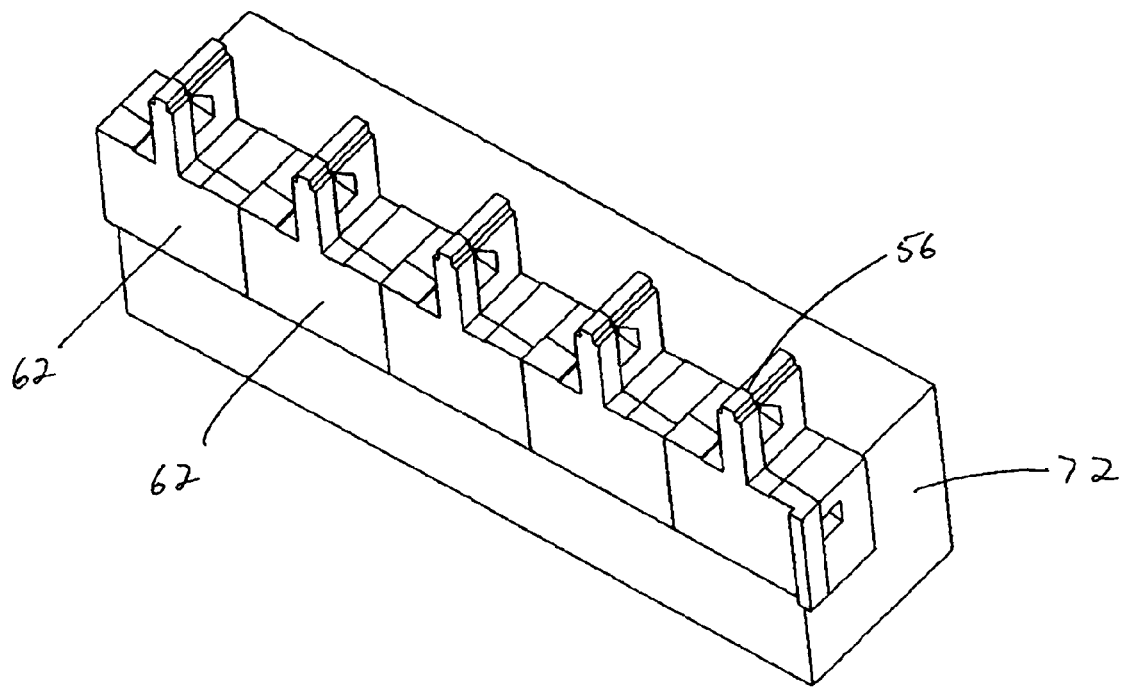
FIG. 6 illustrates a perspective view of one embodiment of a modified multicore bar having portions of core pieces removed to define outwardly extending magnetic elements and read gap tolerances in accordance with the principles of the present invention.
Figure 7:
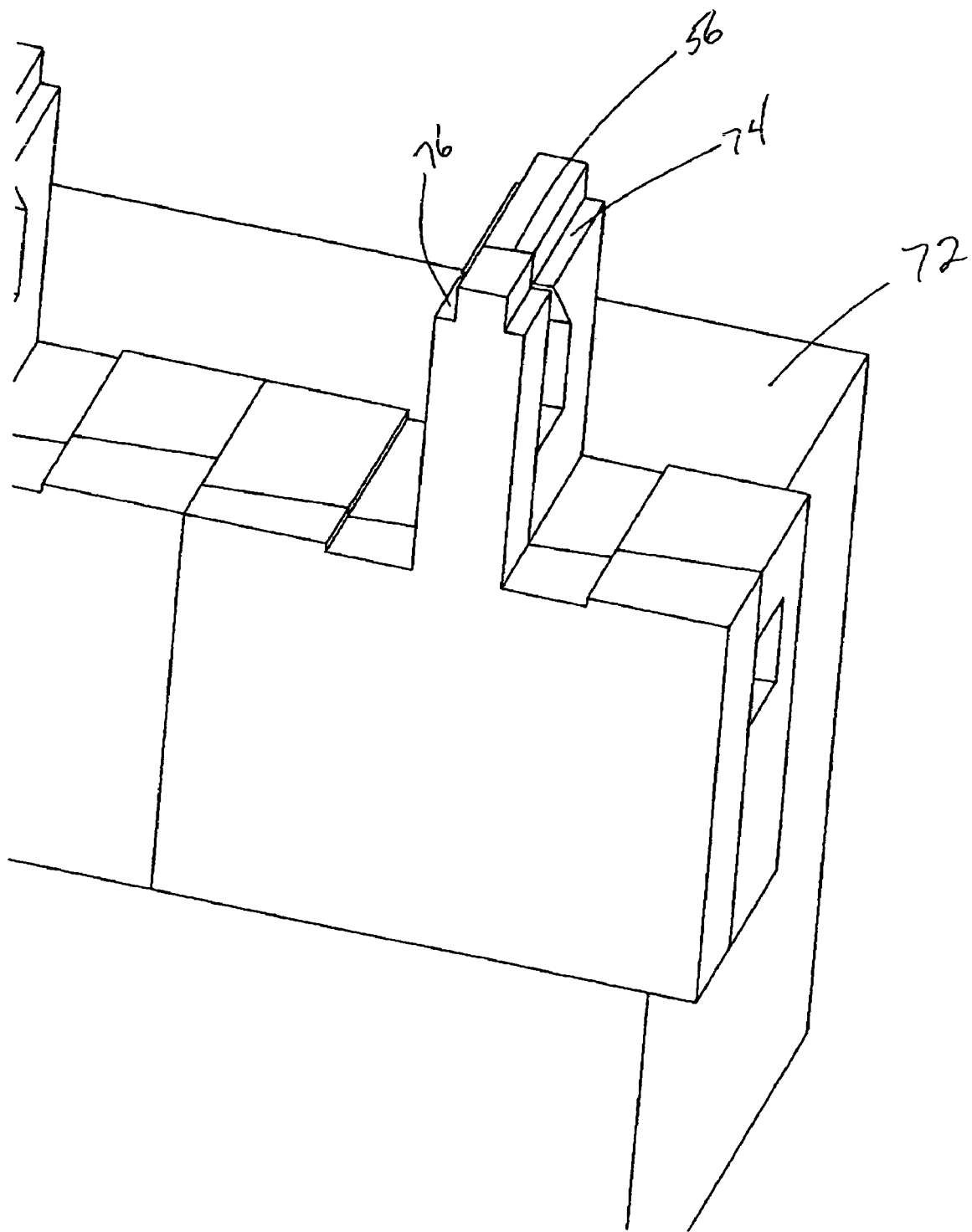
FIG. 7 illustrates a partially enlarged view of one of the core bars of the multicore bar of FIG. 6 in accordance with the principles of the present invention.

Operation 26, FIGS. 6 and 7, modifies the azimuthal multicore bar 70. In one example, operation 26 removes portions of the core pieces 62 from the azimuthal multicore bar, which may be accomplished by machining portions of the core pieces to form T-shaped magnetic elements outwardly extending from the reference block. Cuts 74 and 76 are precision machined surfaces. These surfaces define the width of the magnetic read gap 56. This approach, machining the read gap width and position of all azimuth cores 62 in a single operation, allows precise location and pitch of the read gaps 56 relative to each other. The precision of this approach is greater than that can be achieved by machining the cores individually and then assembling them. In one example, the width of the magnetic read gap 56 is approximately 200 µm, and the pitch between any two adjacent cores is 2.858 mm with a precision of around 1 µm.

Figure 8:
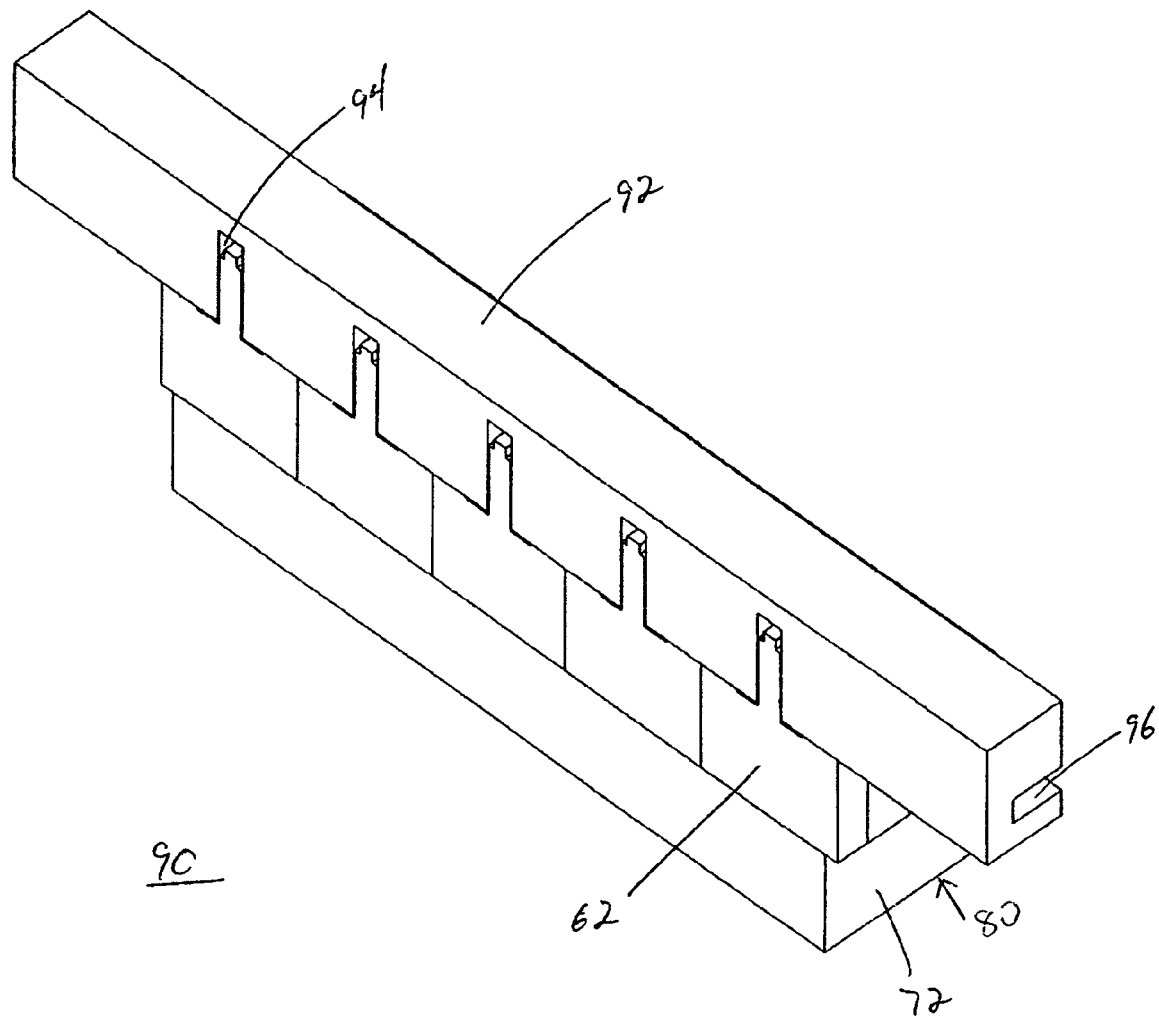
FIG. 8 illustrates a perspective view of a slider element with a plurality of slots bonded with the modified multicore bar of FIG. 6 in accordance with the principles of the present invention.
Figure 8A:
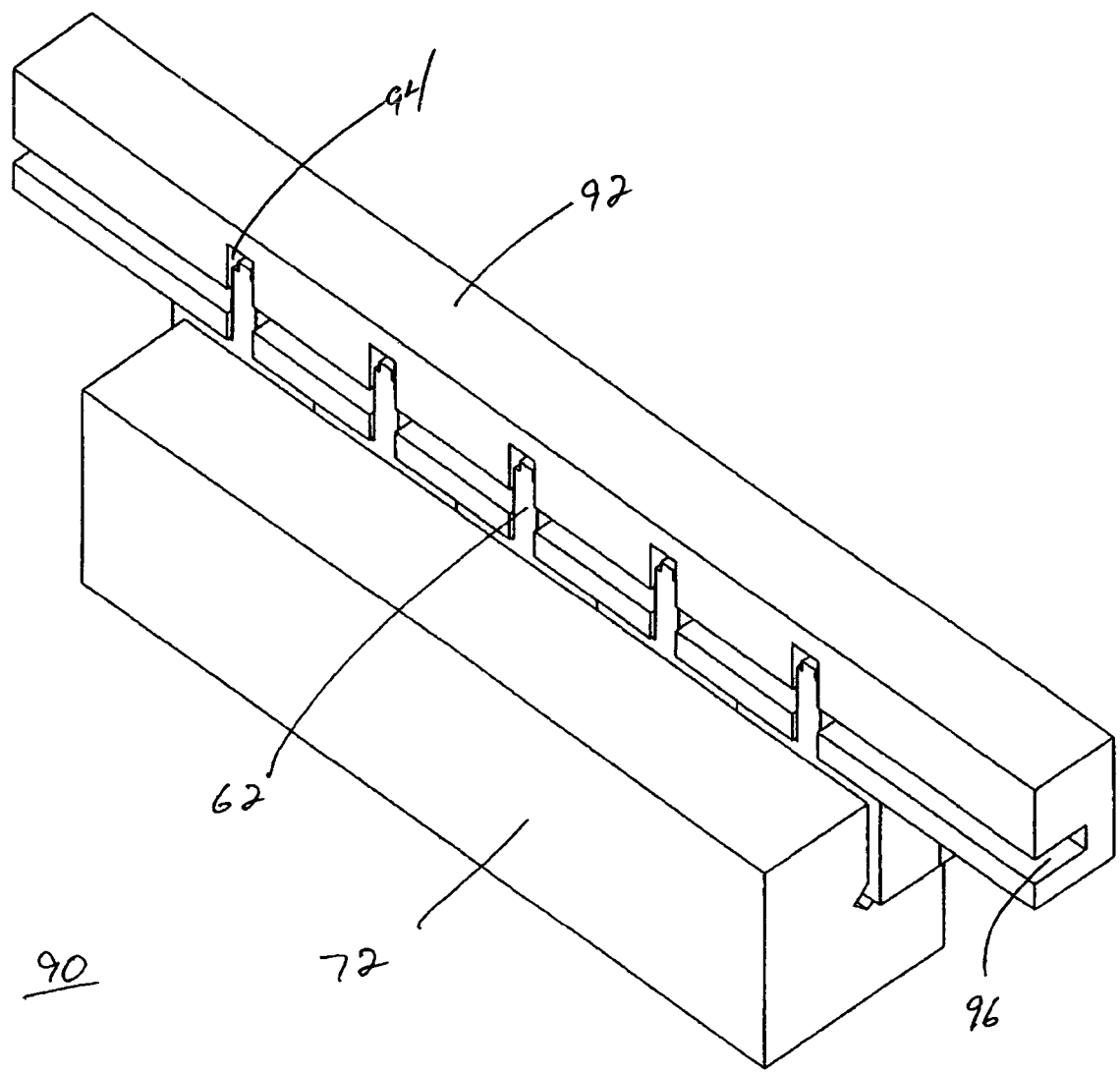
FIG. 8a illustrates a backside of the perspective view of FIG. 8.

At operation 28, FIGS. 8 and 8a, a slider element 92 is bonded to the modified azimuth multi-core bar 80 to form a bonded slider bar 90. In one example, the slider 92 is an elongated, generally rectangular structure having a machined slot 96 extending along its length, and having a plurality of partial slots 94 orthogonally oriented relative to the elongated slot. Each partial slot 94 is adapted to receive the T-shaped magnetic elements extending from the modified multi-core bar 80 of operation 26. Machined slot 96 allows access to slot 58 for winding wire onto the individual cores. The slider 92 will serve as the tape bearing surface of the magnetic head. The slider 92 may be bonded onto the modified azimuthal bar 80 by conventional techniques of epoxy or glass bonding, and may be made from any suitable non magnetic material. In one example, the slider 92 is formed from a nonmagnetic BaTiO ceramic for thermal expansion and tape wear characteristics.

Figure 9:
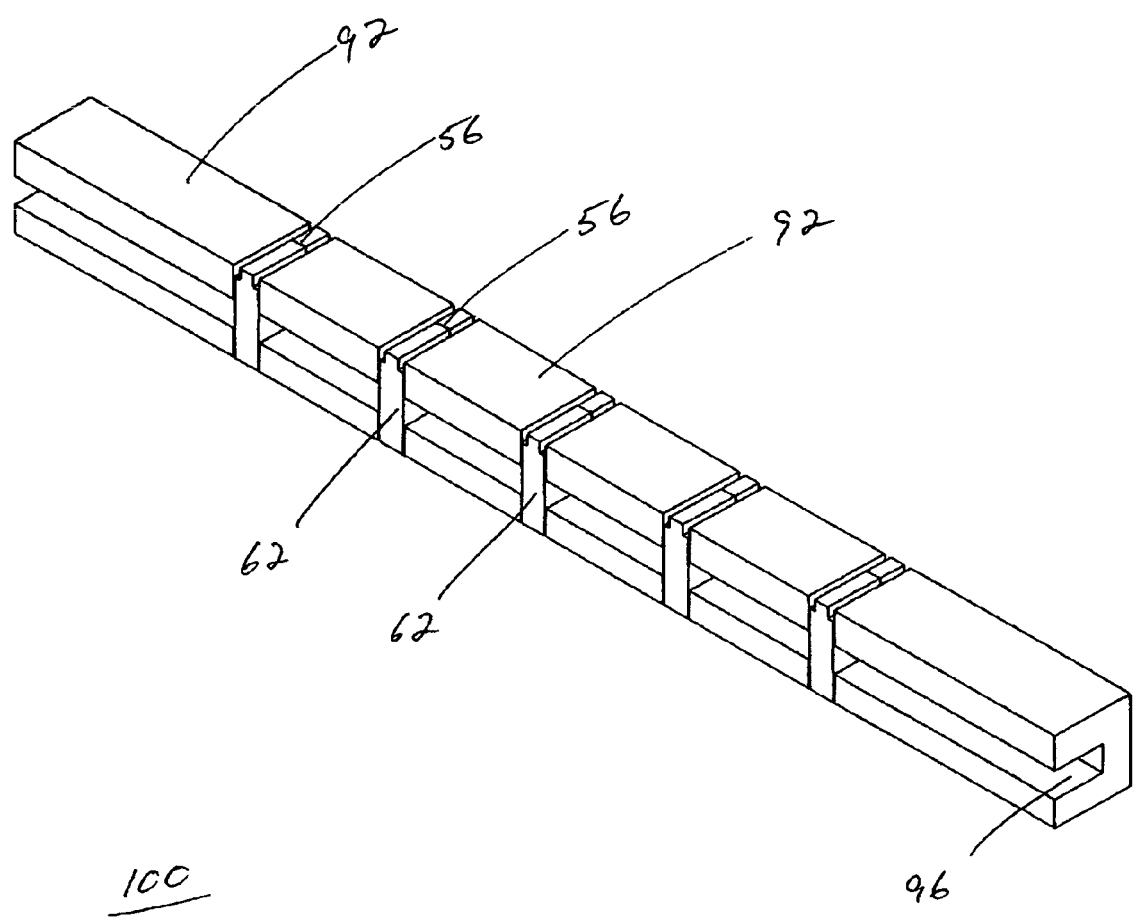
FIG. 9 illustrates a perspective view of a structure having portions of the slider element and multicore bar of FIG. 8 removed to form the first half-slider of a magnetic head in accordance with the principles of the present invention.
Figure 9A:
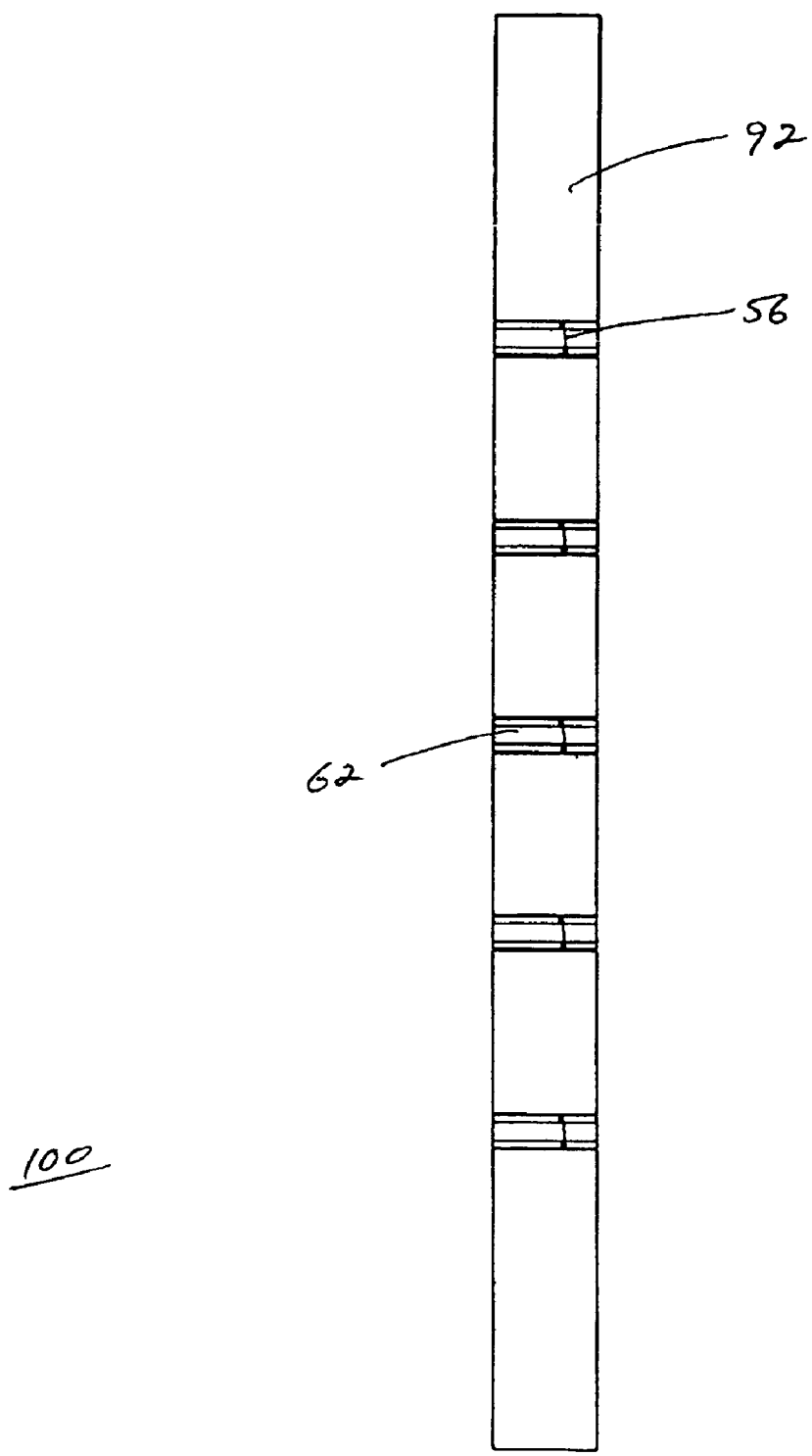
FIG. 9a illustrates a top down view of the structure of FIG. 9.

At operation 30, FIG. 9, the bonded slider bar 90 is machined to form a half-slider 100. In one example, portions of the slider element, core bar, and core pieces are removed to form a first or second half of the magnetic head. For example, the top surface may be processed to expose the individual magnetic structures 62 containing azimuth recording gaps 56. A portion of the L-shaped reference block 72 (FIG. 6) may be removed along with the remaining stock on the bottom of the bar to achieve, for example, a series of five individual separated magnetic cores 62. Each core contains a magnetic structure at an angle to the orthogonal surfaces of the bar. FIG. 9a shows a top down view of the half-slider 100.

Figure 10:
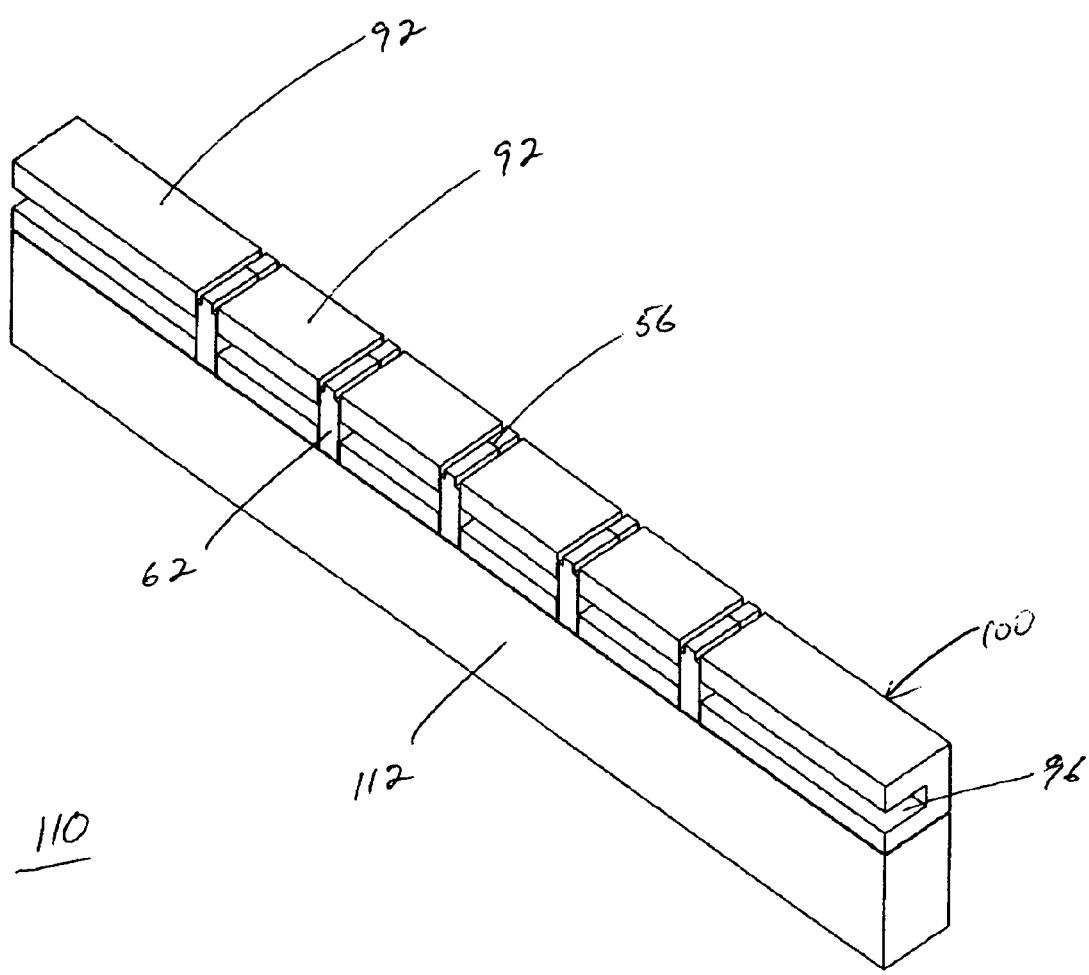
FIG. 10 illustrates a perspective view of one embodiment of the first half of the servo verify head, having a support beam attached, in accordance with the principles of the present invention.

At operation 32, FIG. 10, a support beam 112 is bonded to the bottom of the half-slider 100 to form a half-head 110. In one example, the support beam 112 is formed from a nonmagnetic BaTiO ceramic for a materials match to ferrite.

At operation 34, operations 20-32 are repeated to form the other half-head 110 for use in making the magnetic head 10. For instance, operations 20-32 may be used to form the first half-head 110 with an azimuth angle of +6° and the second half-head 110 with an azimuth angle of −6°.

Figure 11:
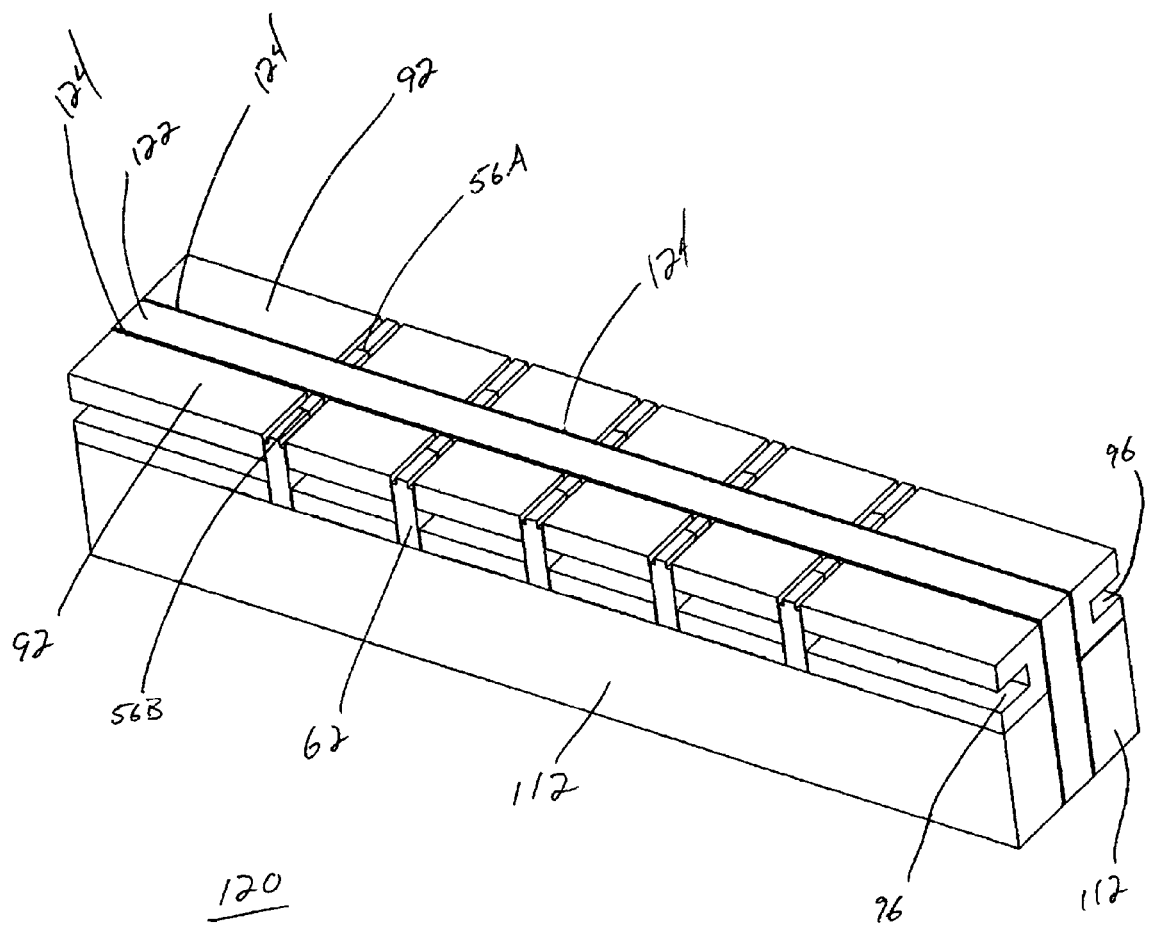
FIG. 11 illustrates a perspective view of one embodiment of a servo verify head where the second half of the servo verify head is bonded to the first half of the servo verify head in accordance with the principles of the present invention.
Figure 12:
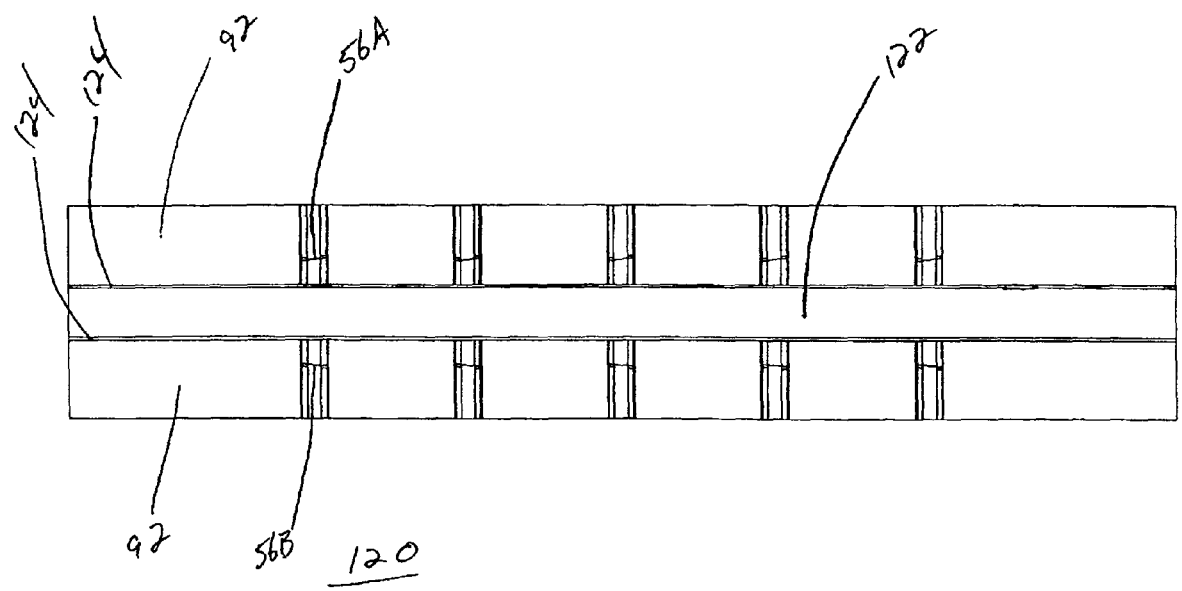
FIG. 12 illustrates a top view of one embodiment of the servo verify head of FIG. 11.

At operation 36, FIGS. 11 and 12, the first and second half-heads 110 are assembled to form the magnetic head 120. In one example, the first and second halves are bonded to a spacer element 122. The spacer element 122 may be any suitable nonmagnetic material to provide isolation between the two halves of the head 120. In one example, two thin sheets of copper 124 are bonded on either side of the spacer element 122 to provide electrical noise isolation between the two halves of the head. In one example, the spacer material 122 is a nonmagnetic BaTiO ceramic, chosen for tape wear characteristics. In one example, the first and second halves 110 are bonded together, where the angle of the magnetic structures on one bar are different than those on the other. If desired, contours to customize head to tape interfaces may now be machined on the surface to produce a final device.

One example of a magnetic head formed by the operations of FIG. 2 is shown in FIGS. 1 and 11-12, where FIG. 12 shows a top view of the head face. In one example, the first magnetic gaps 56A and second magnetic gaps 56B are at +6 and −6° respectively. This full head 10 or 120, may be utilized to verify a TBS pattern on a magnetic tape, where each servo pattern and each angle of any servo pattern may be independently verified. Independent verification allows greater flexibility and accuracy of the servo pattern on tape. In addition, the process described above, resulting in gaps that are parallel but not collinear and hence limiting the overall size of the servo head, allows for a standard cylindrical contour to be machined onto the head face to provide a good and acceptable head to tape interface.

If desired, the process of FIG. 2 can be utilized with any combination of ferrite or thin film head element, which may include inductive, AMR or GMR.

Figure 13:
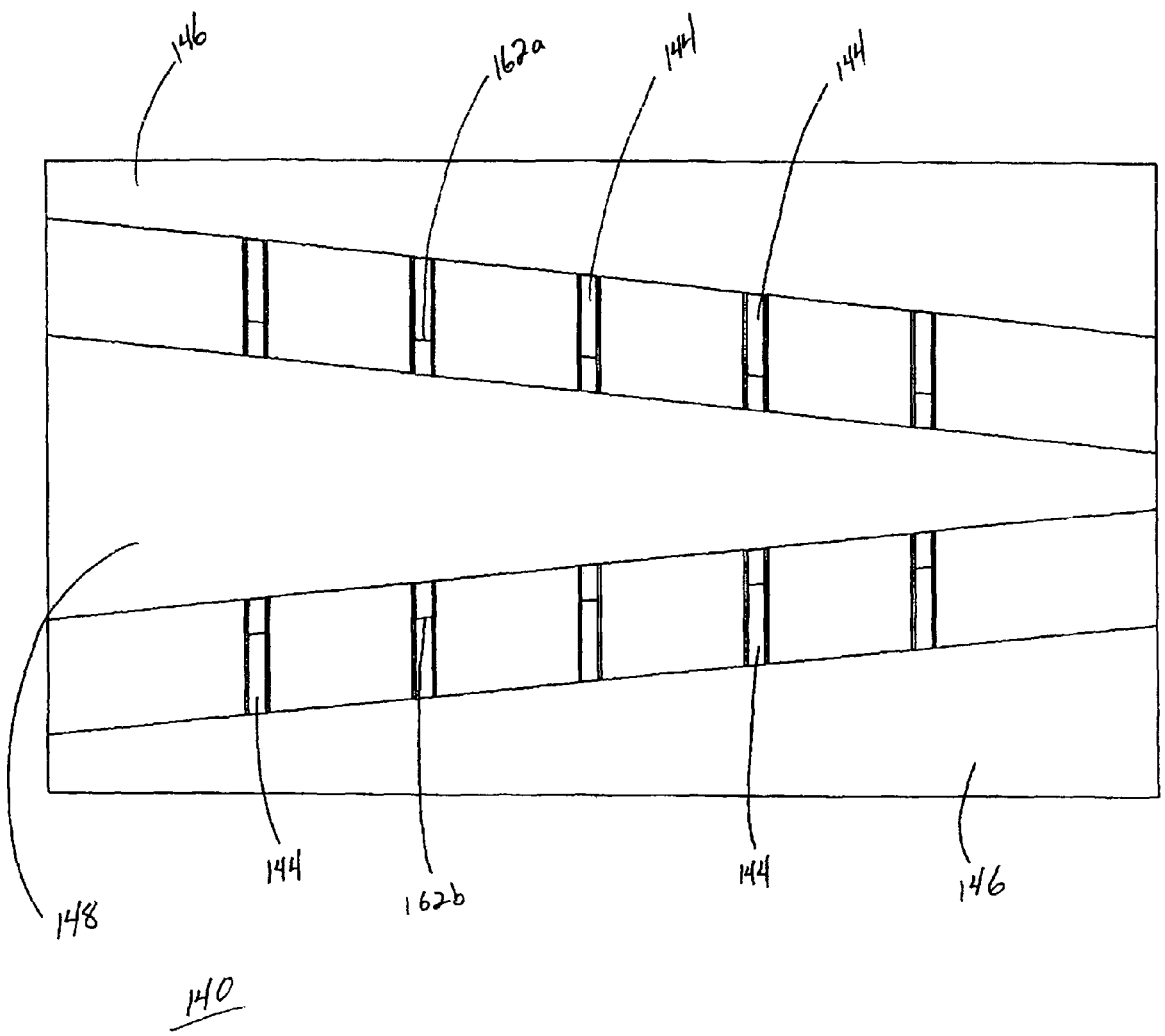
FIG. 13 illustrates a second embodiment of a timing-based servo verify head in accordance with the principles of the present invention.

FIG. 13 illustrates another example of a magnetic head 140 having a plurality of magnetically and electrically independent magnetic elements 144 which may be used, in one example, for reading servo patterns on a magnetic tape. In FIG. 13, the magnetic head includes a first set of magnetic elements and a second set of magnetic elements, wherein the first set of magnetic gaps 162a and the second set of magnetic gaps 162b are disposed to one another along an angle defined by a center spacing element 148. A pair of wedge-shaped outriggers 146 can be used to provide a generally rectangular structure to the head, and the center spacer or center spacing element 148 can be utilized to set the respective angles of the magnetic read gaps 162a and 162b. In one example, each set of magnetic read gaps 162a and 162b are parallel and collinear.

Figure 14:
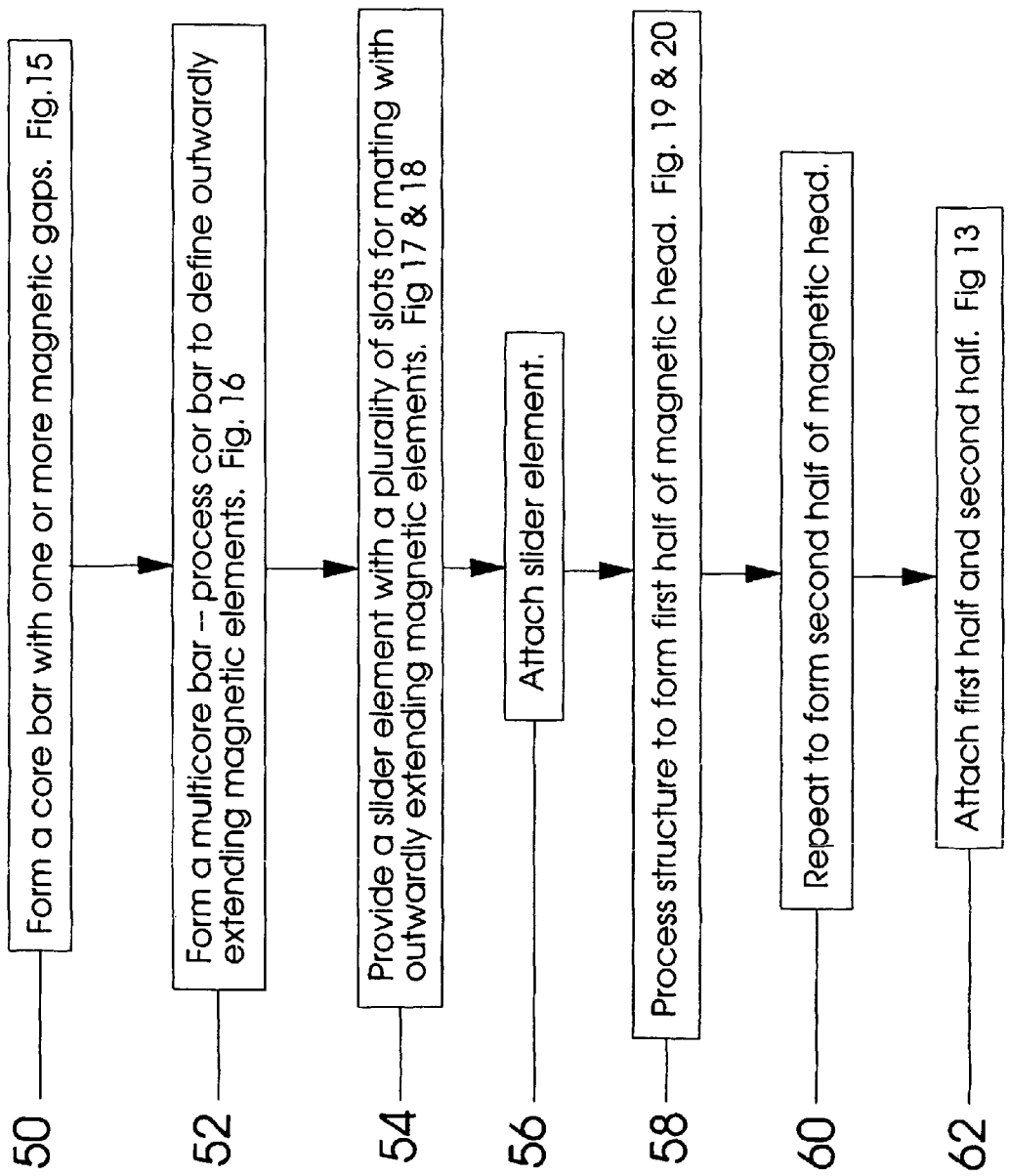
FIG. 14 illustrates a flow chart of a second exemplary process of forming the second embodiment of the timing-based servo verify head of FIG. 13 in accordance with the principles of the present invention.

FIG. 14 illustrates an example of operations that may be used to form a magnetic head, such as the head shown in FIG. 13. The operations of FIG. 14 may be utilized to form a magnetic head of, in one example, a non-standard size or a non-standard head to tape interface.

Figure 15:
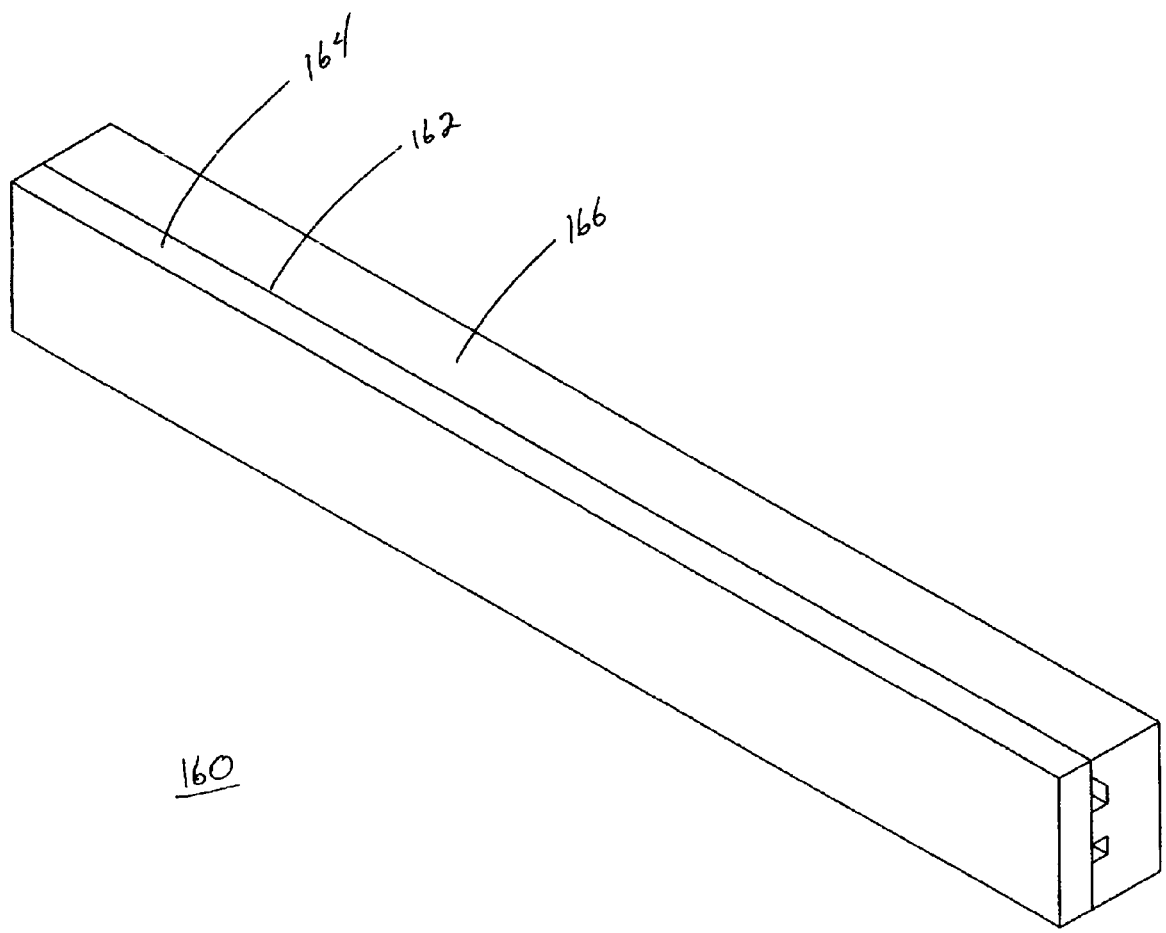
FIG. 15 illustrates a perspective view of one embodiment of a core bar in the process of forming the second embodiment of the timing-based servo verify head of FIG. 13 in accordance with the principles of the present invention.

At operation 50, FIG. 15, a core bar 160 is formed with one or more magnetic gaps 162. The core bar 160 may have the same or similar characteristics as the core bar 50 as described above in FIG. 3 or as produced by operation 20 in FIG. 2. Any suitable gap bar, such as a ferrite gap bar 160 or magnetic head row bar, such as a section of a thin film head wafer that is diced into a row of thin film heads forming a thin film head row bar, may be used as the core bar.

Figure 16:
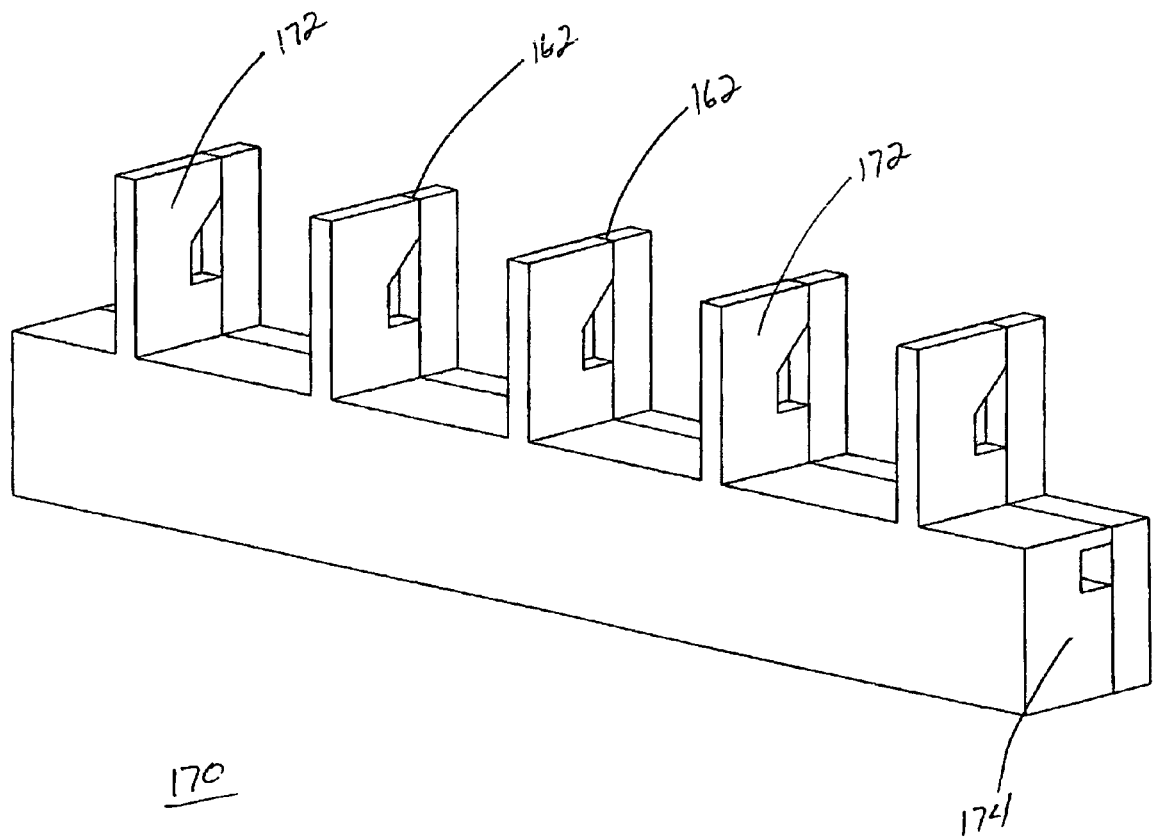
FIG. 16 illustrates a perspective view of one embodiment of the core bar having portions of core pieces removed to define outwardly extending magnetic elements and read gap tolerances in accordance with the principles of the present invention.
Figure 17:
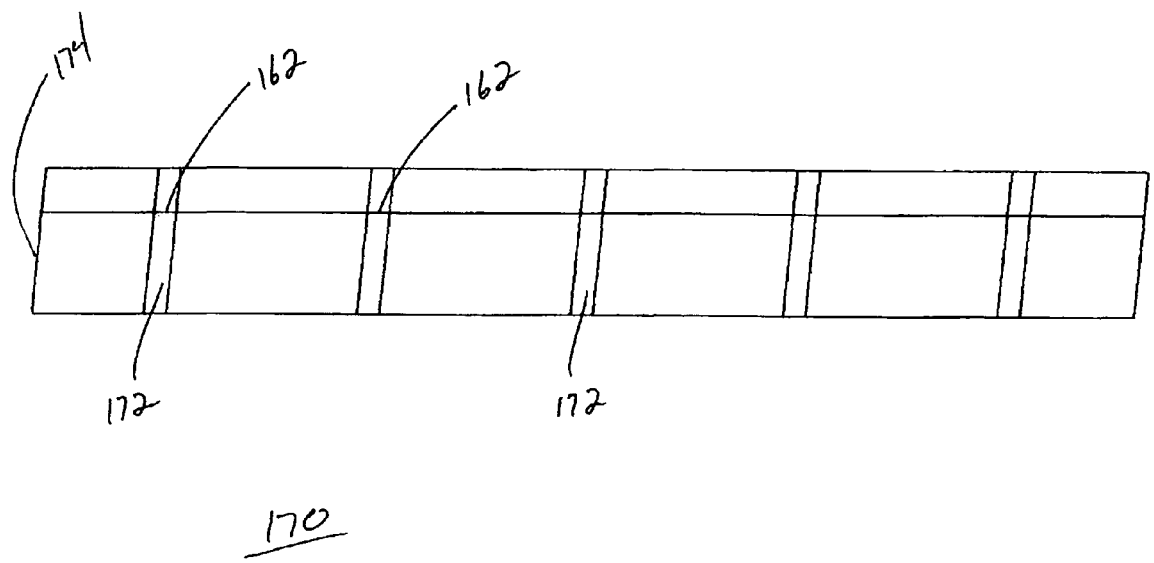
FIG. 17 illustrates a top view of the one embodiment of the core bar shown in FIG. 16.

At operation 52, FIGS. 16 and 17, a multi-core bar 170 is formed by processing or machining the core bar 160 to have a plurality of upwardly extending magnetic elements 172. In one example, five upwardly extending magnetic elements 172 are provided, wherein each of the upwardly extending portions includes at least one magnetic gap 162. In one example, the upwardly extending portions are rectangularly shaped with their long axis at an azimuth angle of +6° with respect to the long axis of the multi-core bar 170. In one example, the multi-core bar edge face 174 is machined at an azimuth angle of +6° with respect to the long axis of the multi-core bar 170. This angled structure can be seen most clearly in FIG. 17. The core bar 170 may have similar tolerance characteristics as the core bar 80 of FIG. 6 made in operation 26.

Figure 18:
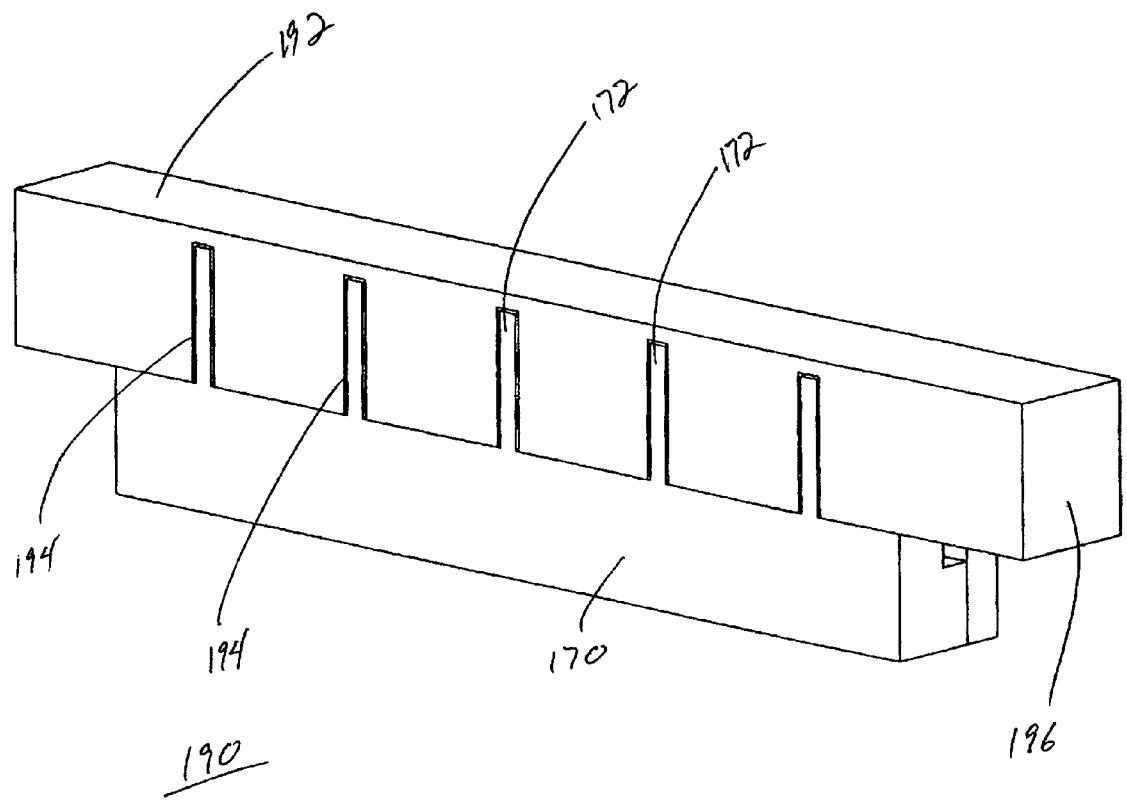
FIG. 18 illustrates a perspective view of a slider element with a plurality of slots for mating with the core bar of FIG. 16 in accordance with the principles of the present invention.

At operation 54, FIG. 18, a slider element 192 with a plurality of slots 194 for mating with the extending magnetic elements 172, is attached to the multi-core bar 170 of operation 52. The slider element 192 will serve as the tape bearing surface and may be made from any suitable nonmagnetic and nonconductive material. In one example, a BaTiO ceramic is used for its tape wear characteristics and its match to the mechanical properties of ferrite. The slider element 192 may be bonded to the core bar 170 by any suitable means, including epoxy or glass bonding, to produce a bonded slider 190. In one example, the ends 196 of the slider element 192 may be machined at an angle of +6° to the long axis of the slider element 192.

The bonded slider element 190 of operation 54 may have the same or similar characteristics as described above with reference to operation 28 of FIG. 2 or FIG. 8.

Figure 19:
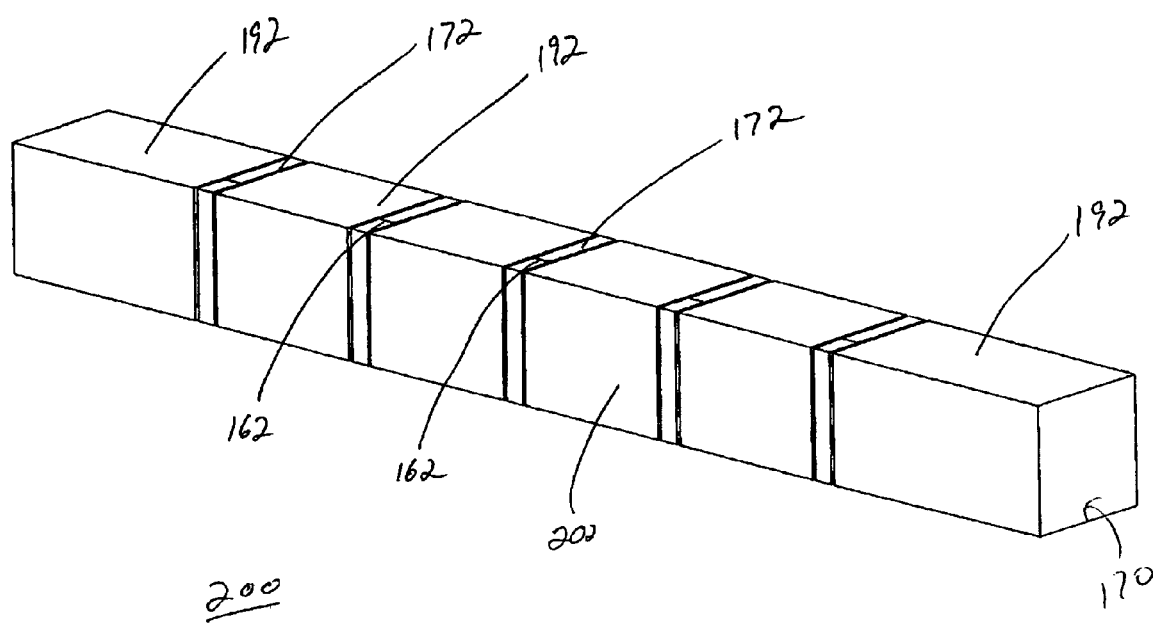
FIG. 19 illustrates a perspective view of a structure having portions of the slider element and core bar of FIG. 18 removed to form the first half of the servo verify head in accordance with the principles of the present invention.
Figure 20:
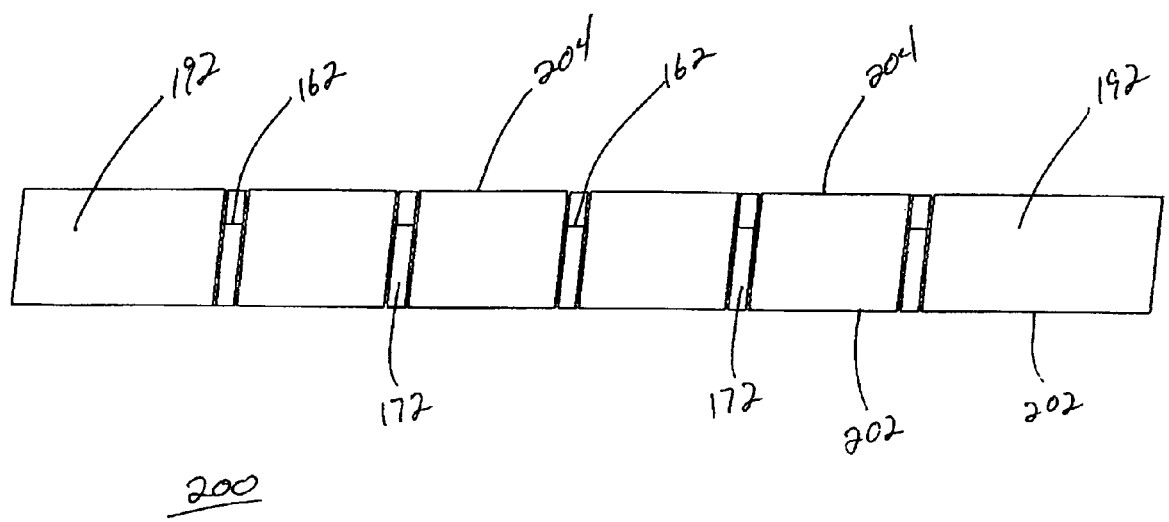
FIG. 20 illustrates a top view of the structure shown in FIG. 19.

At operation 58, FIGS. 19 and 20, the structure of operation 54 is processed to form a first half-head magnetic head structure 200. In one example, the structure 200 is machined on the top surface to expose the magnetic structures 172 and the magnetic sensing gaps 162. The remaining stock on the bottom of the core bar 170 is also removed to achieve a series of five individual magnetic structures or cores 172 separated by the remaining slider element 192. In one example, the long axis faces 202, 204 of the half-head 200 are machined orthogonal to the magnetic gaps 162, as can be seen most clearly in FIG. 20.

At operation 60, the operations 50-58 are repeated to form a second magnetic half-head.

Figure 21:
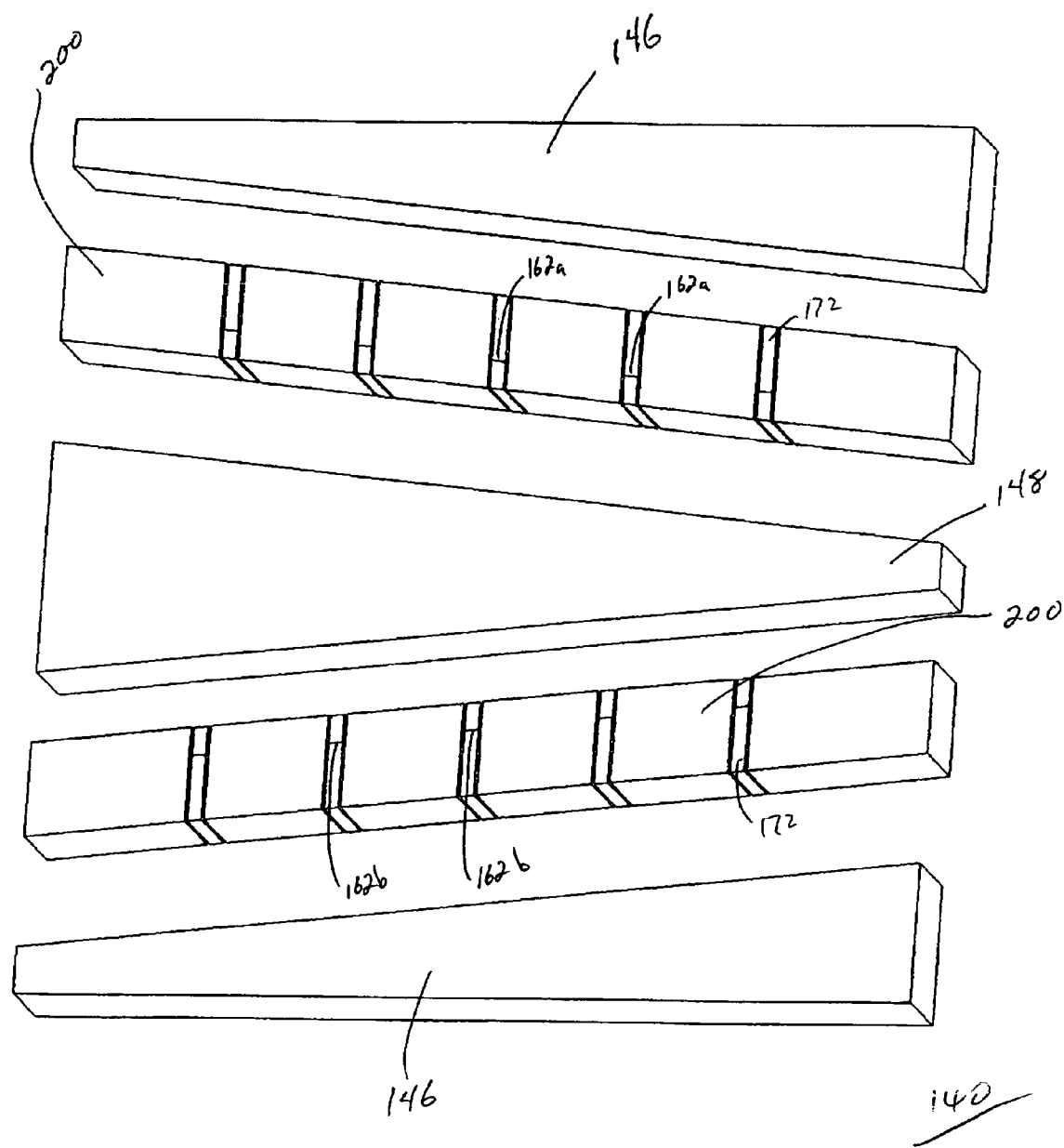
FIG. 21 illustrates an exploded view of one embodiment of the servo verify head shown in FIG. 13 where the second half of the servo verify head is to be bonded to the first half of the servo verify head in accordance with the principles of the present invention.

At operation 62, FIGS. 21 and 13, first and second half-heads 200 are assembled to form the magnetic head 140. FIG. 21 is an exploded view of FIG. 13 for illustrative purposes. In one example, the first and second half-heads 200 formed by operations 50-60 may be attached to the wedge-shaped center spacer element 148, as shown in FIGS. 21 and 13. Further, a pair of wedge-shaped elements or outriggers 146 can be attached to the outer portions of the first and second magnetic half-heads to form the generally rectangular final head 140 as shown in FIG. 13.

The angles of the magnetic structures 172 containing the magnetic sensing gaps 162 may be set by the angles machined into the center spacer 148, or may be free-space aligned. Complimentary angles may be machined into the outriggers 146 so the final head geometry is rectangular, which may provide greater tape dynamic stability when compared with nonrectangular cross-section head geometries. The center spacer 148 and the outriggers 146 may be formed from any suitable nonmagnetic and electrically insulating material. In one example, both 148 and 146 are made from a BaTiO ceramic, chosen for its tape wear characteristics. The head 140, shown in an exploded view in FIG. 21, may be bonded together by any appropriate means, including either epoxy or glass bonding.

Figure 22:
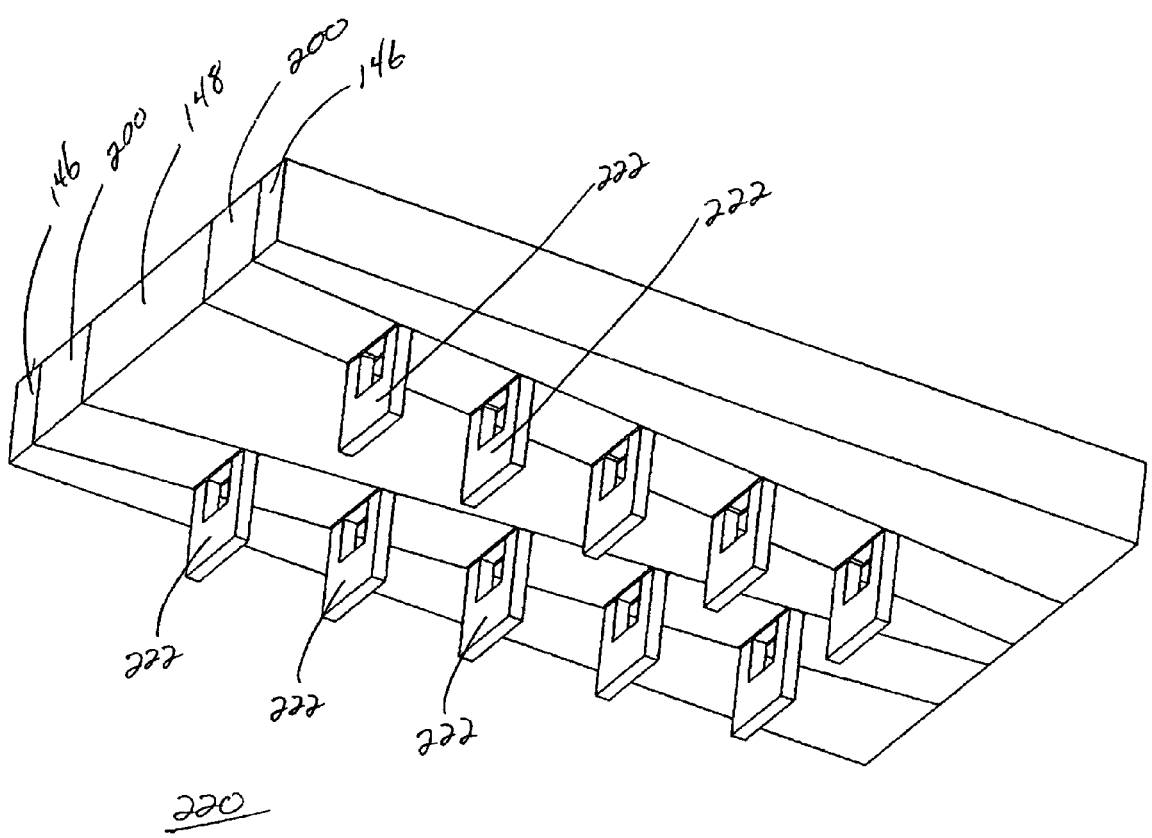
FIG. 22 illustrates a bottom view of the embodiment of the servo verify head after a plurality of magnetic u-cores are attached to the magnetic structure of the servo verify head.

In FIG. 22, the bottom of the servo verify head 140 is shown where magnetic u-cores 222 have been attached to the magnetic structures 172. These u-cores 222 may be wound with wire to complete the magnetic circuit. In one example, these u-core are made from a magnetic NiZn ferrite. FIGS. 13 and 22 represent the completed TBS verify head 220.

The operations of FIG. 14 may be used to reduce the complexity in manufacture of a TBS verify head, as the contour allows for the magnetic read gaps to be parallel and collinear. The operations of FIG. 14 do not require the assembly of individual azimuth cores while maintaining multidimensional tolerances. In addition, the tolerances between and of the individual magnetic structures can be more tightly constrained. The processes of FIGS. 2 and 14 and the device resulting thereof may also be used for the production of a Servo Write head, or any relevant magnetic recording read or write head used in Timing Based Servo.

Figure 23:
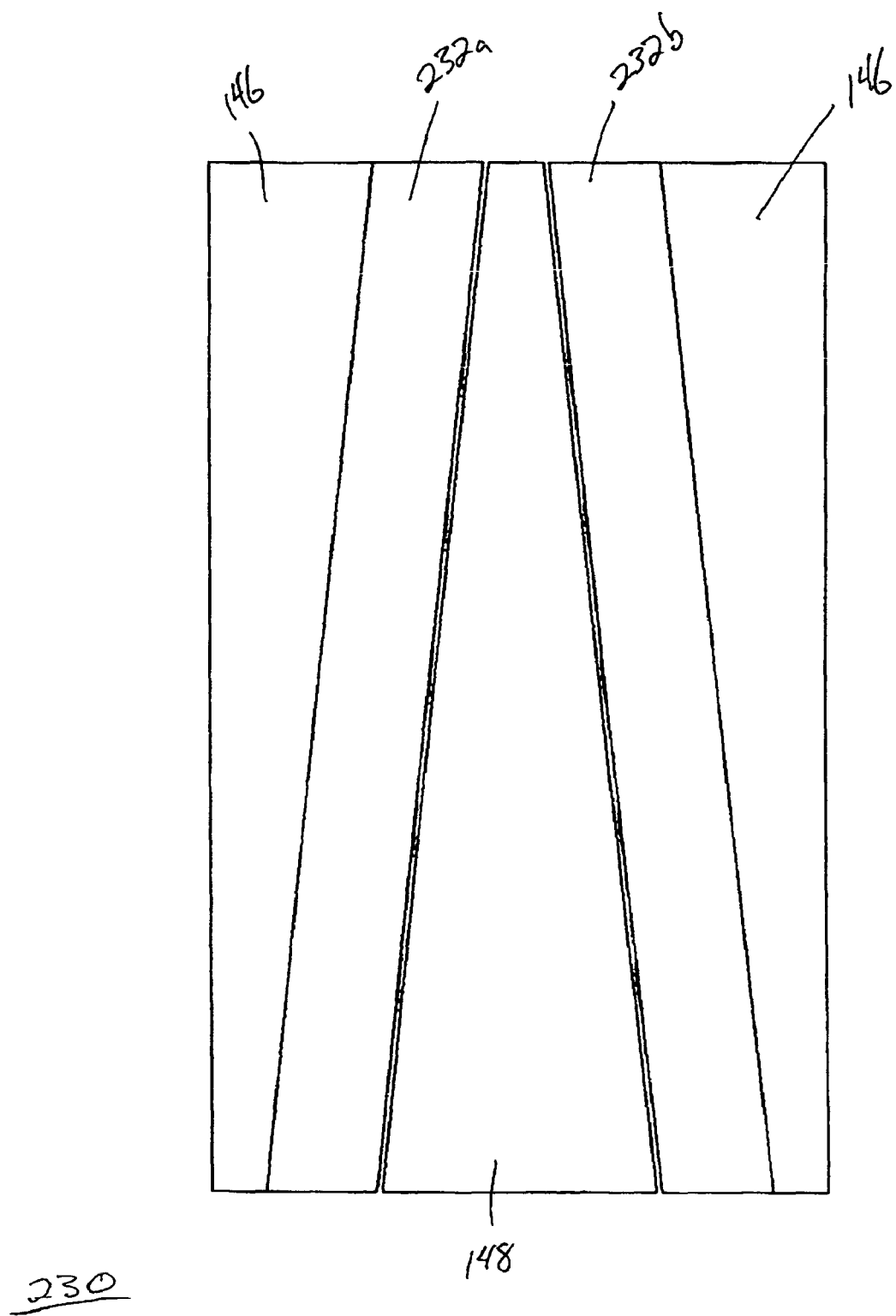
FIG. 23 illustrates a top view of one embodiment of a servo verify head having a core bar that uses a thin film head row bar in accordance with the principles of the present invention.
Figure 24:
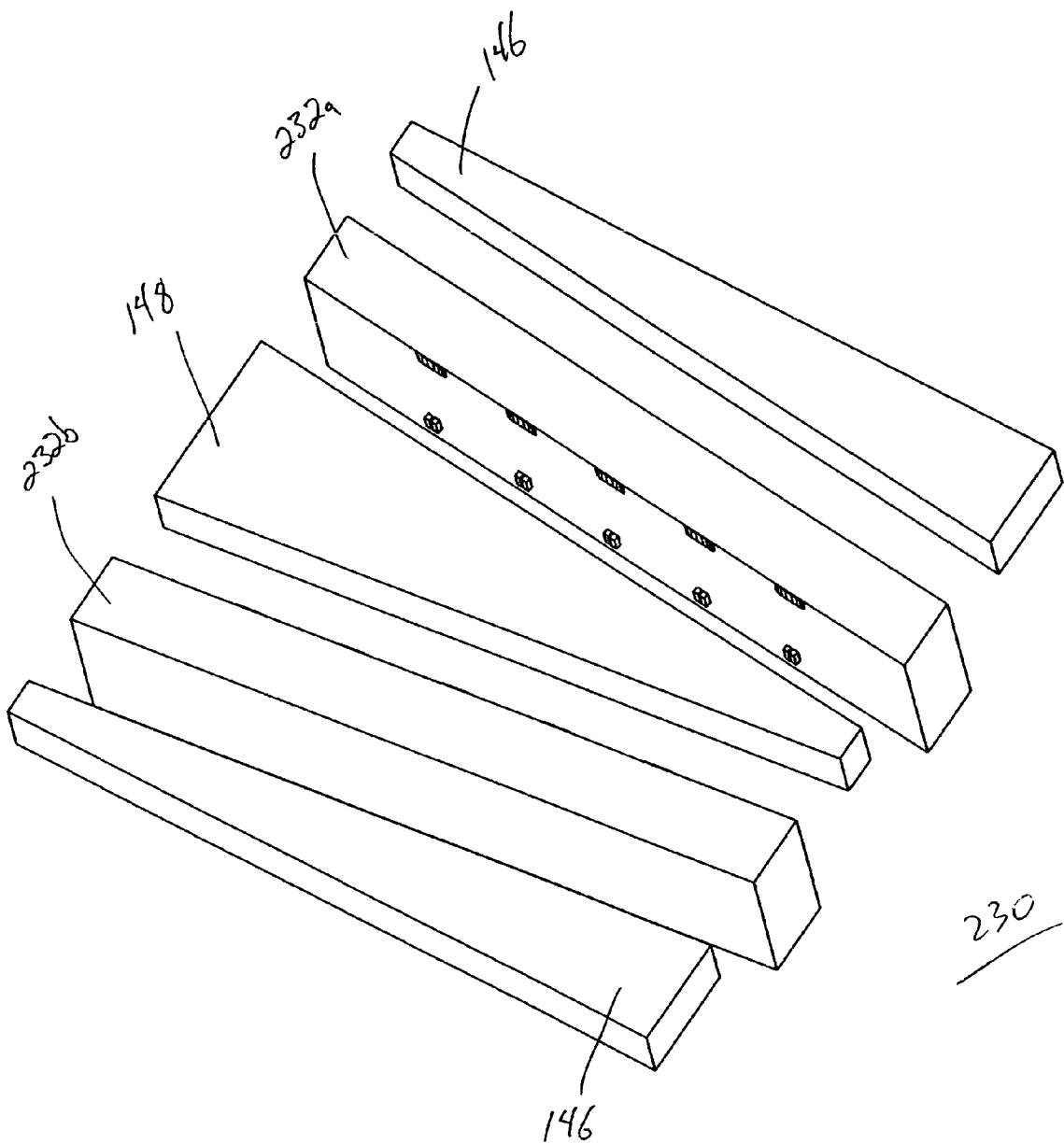
FIG. 24 illustrates an exploded view of the embodiment of the servo verify head having the core bar that uses the thin film head row bar of FIG. 23.

As an additional example of this method, shown in FIGS. 23-24, is a head having a core bar that uses a thin film head row bar 232a, 232b instead of a ferrite half-head bar 200. In one example, two thin film row bars, 232a and 232b, are combined with a center spacer 148 and two outriggers 146 to form the final head 230. The angles of the magnetic structures may be set by the angles machined into the center spacer 148, or may be free-space aligned. Complimentary angles may be machined into the outriggers 146 so the final head geometry is rectangular, in one example.

FIG. 23 shows a top view of the magnetic head 230, while FIG. 24 shows an exploded view of head 230 made according to one example of the present invention. The final contour may be a flat face. The center spacer 148 and the outriggers 146 may be made from any appropriate nonmagnetic material. In one example, elements 146 and 148 are made from an AlTiC ceramic, for tape wear characteristics and material match to the thin film row bar substrate.

This process and device may also be used for the production of a servo write head, or any relevant magnetic recording read or write head used in Timing Based Servo. The thin film row bar may contain any reasonable thin film head, which may include inductive, AMR or GMR elements.

The processes of FIGS. 2 and 14 described previously are for a full-band servo verification head for TBS servo patterns. The azimuth angle of the magnetic structures is used to align the magnetic sensor on the servo verify head to the azimuth angle of the recorded servo pattern on the media. As an alternative to this approach, the verify magnetic read gap may be restricted to a width much less than the servo track width. As previously discussed, such a structure may not suffer from azimuth alignment loss of the sensed signal as the angle is effectively zero over such small track widths. A verify head constructed as such, a so called partial-band verify, would then be mechanically scanned along the width of the pattern to be verified. Such a head, constructed of independent read elements could be fabricated as a straight row bar or gap bar, i.e. without the azimuth angle. In addition, such a head would only require one magnetic sensing gap, rather than a separate gap for each pattern angle. This head could be constructed from any combination of ferrite or thin film head element, which may include inductive, AMR or GMR.

Figure 25:
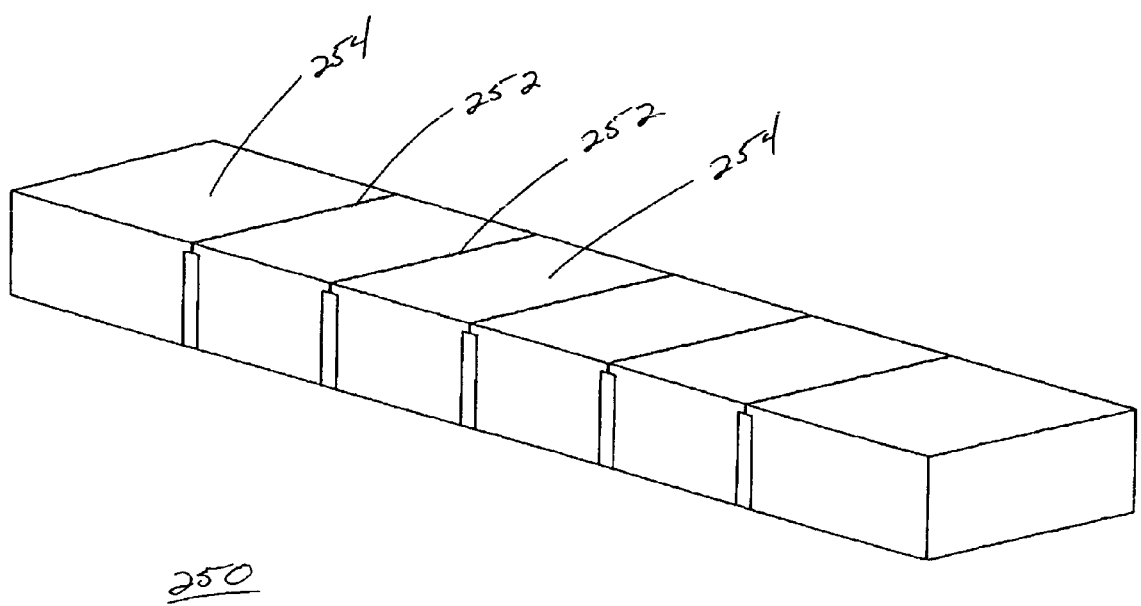
FIG. 25 illustrates a perspective view of a third embodiment of a timing-based servo verify head using scanning head technique in accordance with the principles of the present invention.

FIG. 25 represents one embodiment of a servo verify head 250 using a scanning head technique wherein the magnetic servo verify head 250 includes five independent magnetic elements 252 interlaced between six ceramic slider elements 254. The servo verify head 250 may be formed by processing techniques similar in style to those of FIGS. 2 and 14 previously described, with the exception that all processing is performed in an orthogonal system. i.e. there are no azimuth angles machined into the head.

Figure 26:
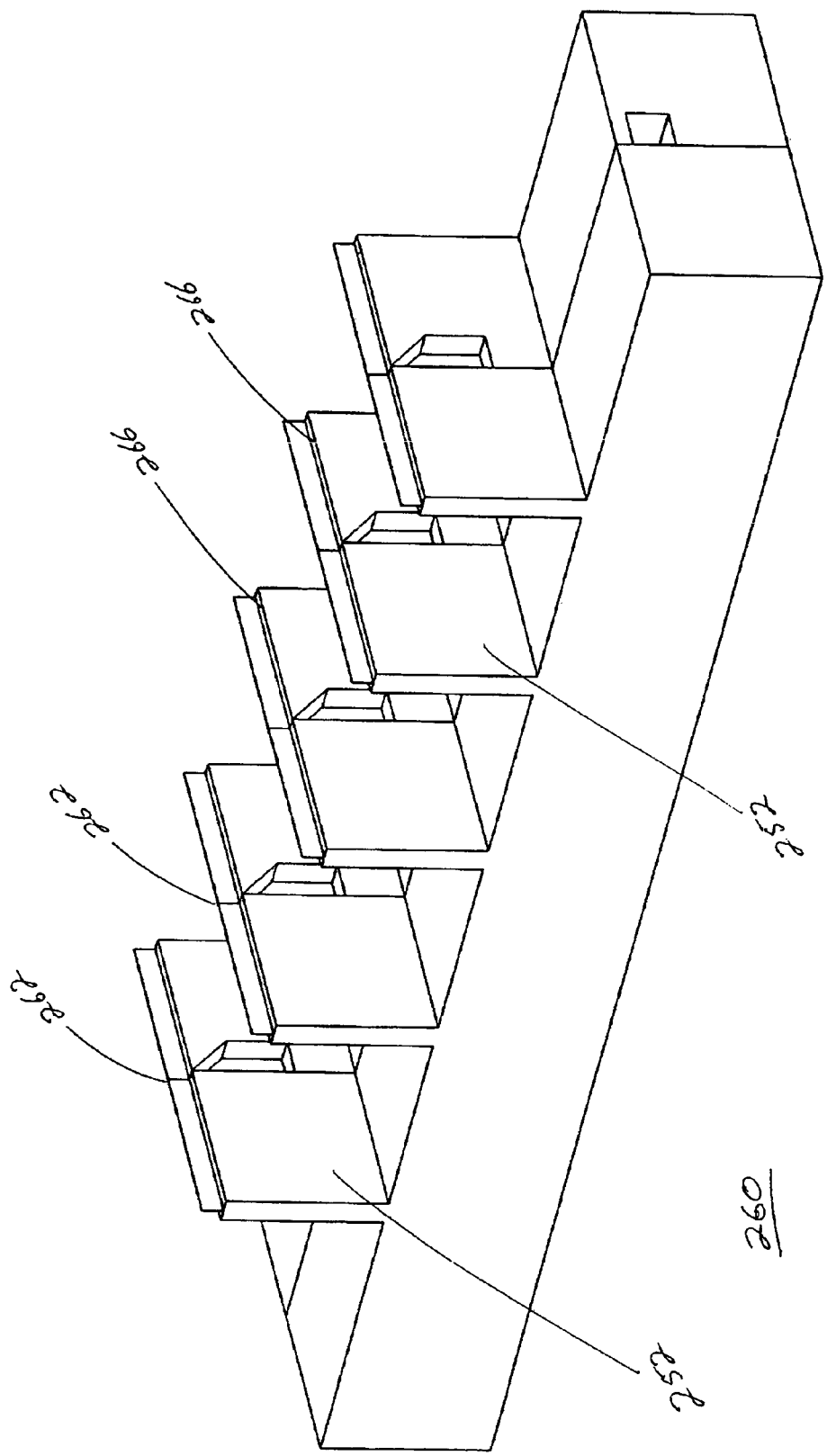
FIG. 26 illustrates a perspective view of one embodiment of a core bar as shown in FIGS. 3 and 15 having portions of core pieces removed to define outwardly extending magnetic elements and read gap tolerances in accordance with the principles of the present invention.
Figure 27:
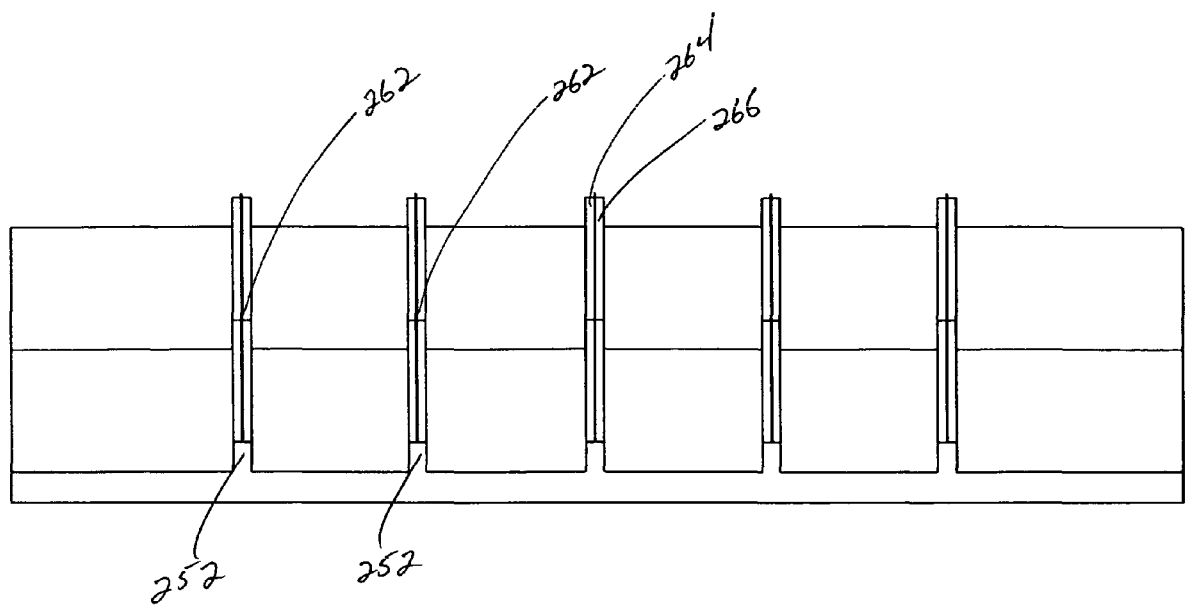
FIG. 27 illustrates a top view with a slanted angle of the embodiment of the core bar shown in FIG. 26.
Figure 28:
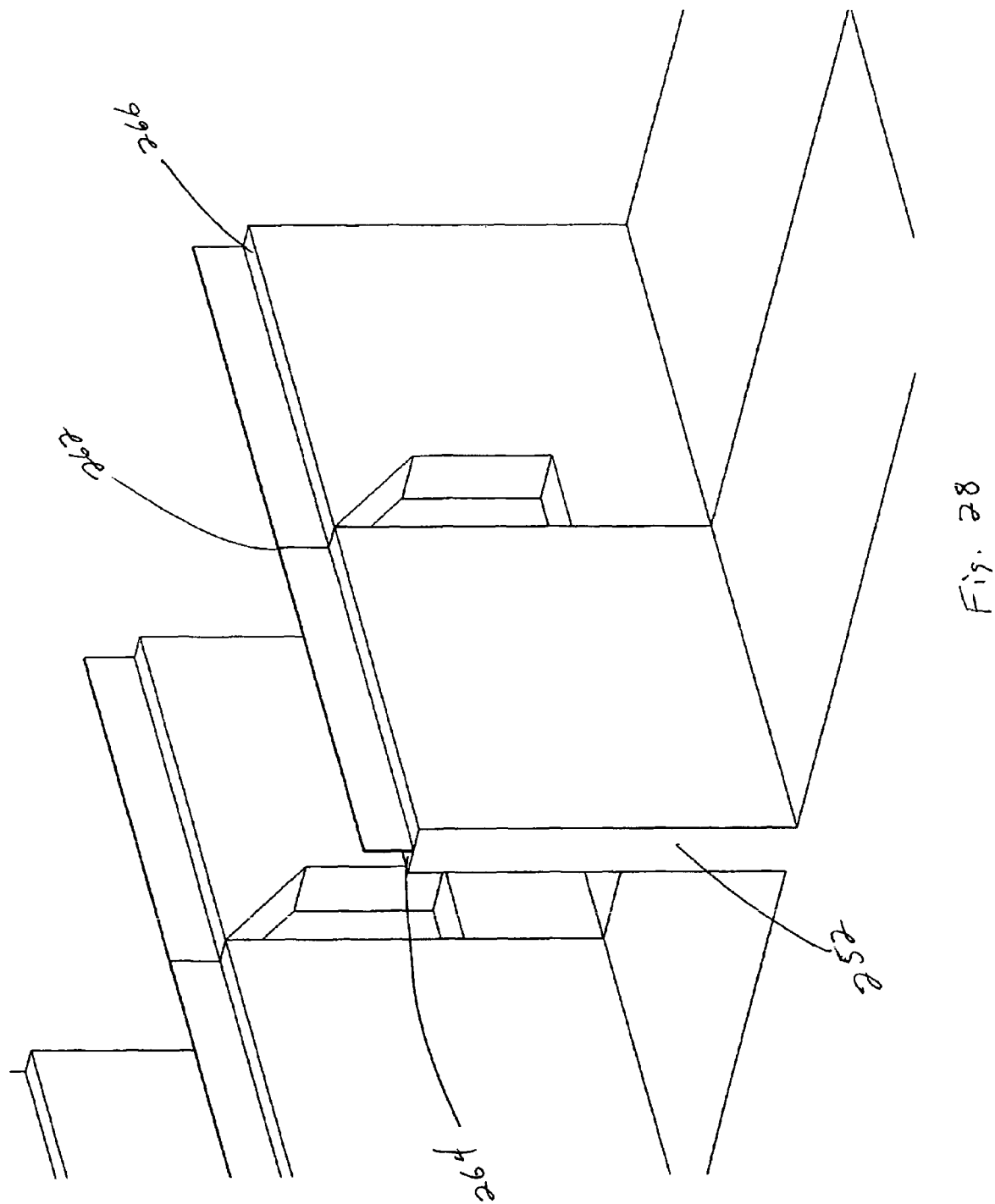
FIG. 28 illustrates a partially enlarged view of the embodiment of the core bar shown in FIG. 26.

In one example, as with the embodiments described in the full-band servo verify heads, a ferrite gap bar which may be similar to those of FIG. 3 or 15 is processed to form a multi-core bar 260, FIGS. 26-28. In one embodiment, material is removed leaving magnetic structures 252 with magnetic gaps 262. In one embodiment, slots 264 and 266 are processed on the top of the magnetic structures 252 producing the magnetic read gap 262 with a width of approximately 10 μm. The orthogonal processing can be seen most clearly in FIG. 27, where the magnetic structures 252 are orthogonal to the long axis of the ferrite gap bar. The slots 264 and 266, used to define the read sensor gap 262 width, can be seen most clearly in FIG. 28. In one example, FIG. 26 is similar in style to FIGS. 6 and 16.

Figure 29:
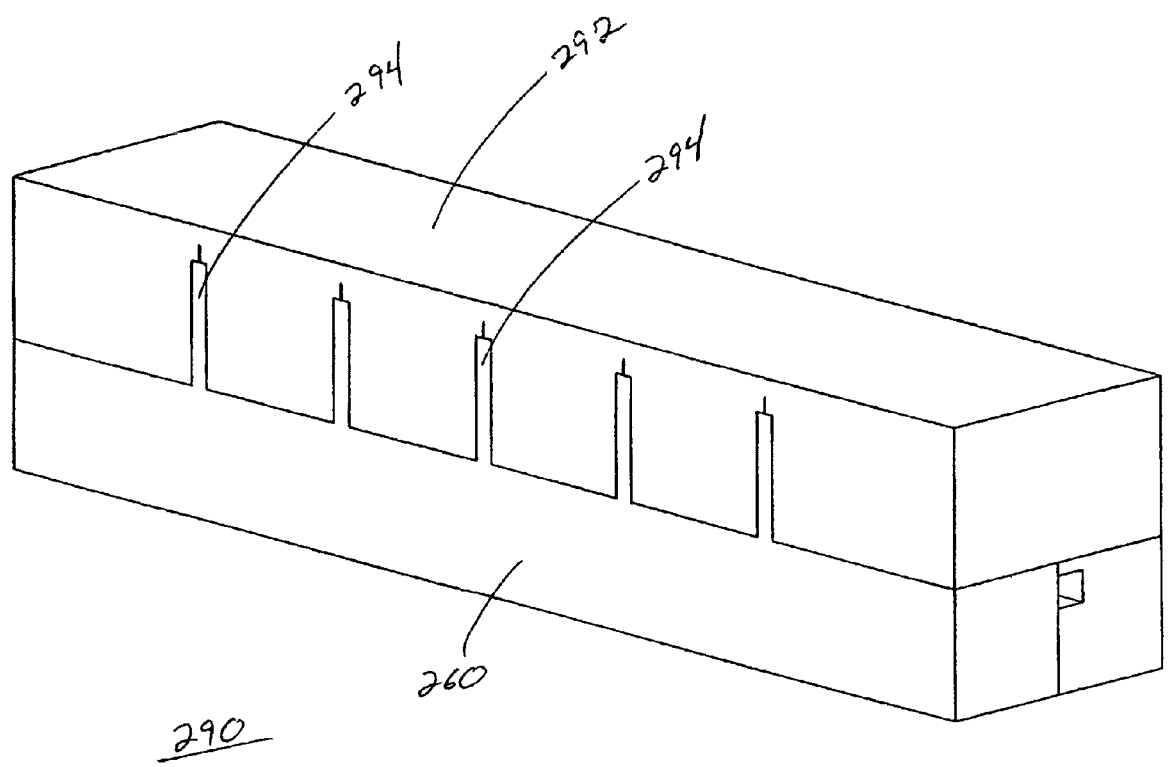
FIG. 29 illustrates a perspective view of a slider element with a plurality of slots for mating with the core bar of FIG. 26 in accordance with the principles of the present invention.

As described in the processes of FIGS. 2 and 14, a mating slider is attached to the multi-core bar 260. FIG. 29 shows one embodiment of this process. A slider 292, comprising five complimentary slots 294 is mated to the multi-core bar 260 producing the bonded slider 290. The slider 292 may be attached using any appropriate technique such as glass or epoxy bonding, and may be made from any suitable nonmagnetic material. In one embodiment, the slider element 292 is made from BaTiO ceramic, chosen for its tape wear characteristics and materials match to the ferrite multi-core bar 260. The bonded slider 290 may be processed similar to operations 30 and 58, FIGS. 9 and 19 respectively, to produce the magnetic servo head 250 of FIG. 25.

Figure 30:
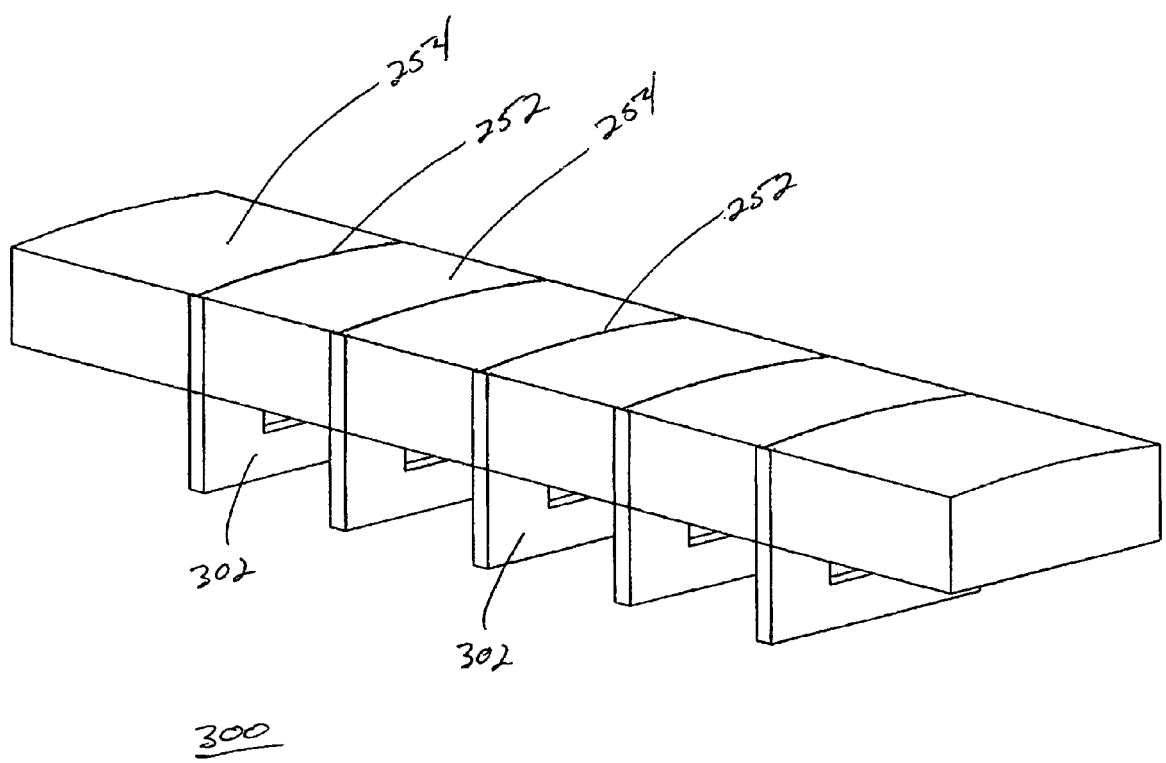
FIG. 30 illustrates a perspective view of the embodiment of the servo verify head shown in FIGS. 25-29 after a plurality of magnetic u-cores are attached to the magnetic structure of the servo verify head.

FIG. 30 shows one embodiment of the partial-verify, or scanning servo verify head 300. The magnetic head 300 has been processed to create a cylindrical contour on the surface to obtain a good or acceptable head to tape interface. In addition, u-cores 302 have been attached to the bottom of the head 300. Wire may be wound on the u-cores 302 to complete the magnetic sensing circuit.

As previously described, the partial-verify head 300 may be scanned along the width of a TBS servo pattern. In one example, a TBS pattern with a width of 190 μm at an azimuth angle of 6° can be verified by a read sensor with a width of 5-10 μm at an azimuth angle of 0°, the head 300 being continuously scanned back and forth along the 190 μm track width of the servo band. In this example, the partial-verify head may sense any particular 10 μm segment of the 190 μm track width. In one example, the head 300 possesses at least one magnetic sensing element per servo band to be verified, such that all servo patterns spanning the tape may be partial-verified in a single pass of the media. This head could be constructed from any combination of ferrite or thin film head element, including inductive, AMR or GMR.

As previously mentioned, a factor of the scanning or partial-verify method is the scan rate. The scan rate represents the fraction of any servo band width sampled. One means of reducing this factor is to reduce the scan rate. This may be accomplished by a partial-verify head with more than one sensing gap per servo band. In one example, a partial-verify head has five independent sensing regions, each sensing region comprising two or more sensing gaps.

In one example, two sensing gaps, each 10 μm in width, are spaced 100 μm apart from center to center. In this example, a servo pattern with a 190 μm track width may be scanned in approximately half the time as compared to the embodiment of FIG. 30, as each sensing gap would have to traverse only half the pattern. The use of multiple sensing gaps for each servo band may significantly reduce the scan rate of the partial-verify method, correspondingly increasing the defect detection efficiency. This head could be constructed from any combination of ferrite or thin film head element, which may include inductive, AMR or GMR.

One example of a TBS system currently used in industry is the so-called Linear Tape Open ("LTO") system. LTO utilizes a series of five servo bands to span the tape in the cross-track direction. The embodiments of a TBS verify magnetic head described herein may allow all servo bands to be simultaneously and independently verified. Such a quality is valuable in the production environment as it combines both efficiency and accuracy.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

Although the present invention has been described with reference preferred embodiments, persons skilled in the art will recognize that changes may be made in form and detail without departing from the spirit and scope of the invention.

What is claimed is:

1. A servo apparatus for verifying at least one timing based pattern printed on media, comprising:
    a first magnetic azimuthal core bar comprising a pair of magnetic cores bonded together with a first magnetic read gap disposed between the magnetic cores, the pair of magnetic cores arranged and configured such that the first magnetic read gap is parallel to at least a portion of a first magnetic transition of a timing based pattern of a servo band, the first magnetic transition being non-orthogonal to the transverse direction of the media; and
    a second magnetic azimuthal core bar comprising a pair of magnetic cores bonded together with a second magnetic read gap disposed between the magnetic cores, the pair of magnetic cores arranged and configured such that the second magnetic read gap is parallel to at least a portion of a second magnetic transition of the timing based pattern, the second magnetic transition also being non-orthogonal to the transverse direction of the media and non-parallel to the first magnetic transition;
    wherein the first magnetic read gap and the second magnetic read gap are non-parallel so that the first and second magnetic read gaps at least partially cover the first and second non-parallel magnetic transitions of the timing based pattern.

2. The servo apparatus of claim 1, wherein the media is a magnetic tape.

3. The servo apparatus of claim 1, wherein the first and second magnetic azimuthal core bars each comprise a plurality of pairs of magnetic cores arranged and configured such that each of the magnetic read gaps of the first magnetic azimuthal core bar are parallel and not co-linear to each other and each of the magnetic read gaps of the second magnetic azimuthal core bar are parallel and not co-linear to each other.

4. The servo apparatus of claim 1, wherein the first and second magnetic azimuthal core bars each comprise a plurality of pairs of magnetic cores arranged and configured such that each of the magnetic read gaps of the first magnetic azimuthal core bar are parallel and co-linear to each other and each of the magnetic read gaps of the second magnetic azimuthal core bar are parallel and co-linear to each other.

5. The servo apparatus of claim 1, wherein the first and second magnetic read gaps are angled gaps which are non-orthogonal to an edge of the magnetic azimuthal core bar.

6. The servo apparatus of claim 1, wherein the first and second magnetic read gaps cover an entire length of the first and second magnetic transitions, respectively, of the timing based pattern such that the servo head is capable of verifying each of the first and second magnetic transitions in its entirety at the same time.

7. The servo apparatus of claim 1, wherein the magnetic read gap samples a plurality of magnetic transitions of the at least one timing based pattern by scanning the magnetic read gap perpendicular to the direction of the media.

8. The servo apparatus of claim 1, wherein the first magnetic azimuthal core bar and the second magnetic azimuthal core bar are operably coupled by bonding the first and second magnetic azimuthal core bars to a substantially nonmagnetic spacer element.

9. A magnetic head comprising:
    a first magnetic row bar element comprising a plurality of gap elements, the gap elements each comprising at least a portion having a length and each being co-linear with the other gap elements of the first magnetic row bar element in the lengthwise direction of the gaps; and
    a second magnetic row bar element comprising a plurality of gap elements, the gap elements each comprising at least a portion having a length and each being co-linear with the other gap elements of the second magnetic row bar element in the lengthwise direction of the gaps;
    wherein the first and second magnetic row bar elements are arranged and configured such that the gap elements of the first magnetic row bar element are not parallel and not co-linear to the gap elements of the second magnetic row bar element and each of the gap elements is non-orthogonal to an edge of the magnetic head.

10. The magnetic head of claim 9, wherein the media is a magnetic tape.

11. The magnetic head of claim 9, wherein the first and second magnetic row bar elements are thin film row bars.

12. The magnetic head of claim 9, wherein the first and second row bar elements are bonded onto a spacer disposed therebetween, the spacer defining the angles of the gap elements of the first and second row bar elements.

13. The magnetic head of claim 9, wherein the first and second magnetic row bar elements are arranged and configured such that each of the gap elements of the first magnetic row bar element are aligned with a corresponding gap element of the second magnetic row bar element in the direction of tape motion of the media.

* * * * *